United States Patent
Tabata et al.

(10) Patent No.: US 7,917,277 B2
(45) Date of Patent: Mar. 29, 2011

(54) CONTROL APPARATUS FOR VEHICULAR DRIVE SYSTEM

(75) Inventors: Atsushi Tabata, Okazaki (JP); Tooru Matsubara, Toyota (JP); Yuji Iwase, Mishima (JP); Hiroyuki Shibata, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 503 days.

(21) Appl. No.: 12/073,963

(22) Filed: Mar. 12, 2008

(65) Prior Publication Data

US 2008/0234914 A1    Sep. 25, 2008

(30) Foreign Application Priority Data

Mar. 19, 2007 (JP) ................................. 2007-071339

(51) Int. Cl.
*G06F 19/00* (2006.01)
(52) U.S. Cl. ................ 701/99; 701/51; 701/60; 701/61; 701/59; 477/5; 477/50; 475/150; 180/65.265; 180/65.21; 180/65.235; 180/65.275
(58) Field of Classification Search .................... 701/51, 701/61, 60, 59, 99; 477/5, 50; 475/150; 180/65.265, 65.21, 65.235, 65.275
See application file for complete search history.

(56) References Cited

U.S. PATENT DOCUMENTS 7,549,944 B2 * 6/2009 Tabata et al. ...................... 477/5
7,601,093 B2 * 10/2009 Tabata et al. ...................... 477/5

(Continued)

FOREIGN PATENT DOCUMENTS

| JP | A 09-322312 | 12/1997 |
|---|---|---|
| JP | A 09-331602 | 12/1997 |
| JP | A 2005-264762 | 9/2005 |

(Continued)

OTHER PUBLICATIONS

May 25, 2010 Office Action issued in Japanese Patent Application No. 2007-071339 (with translation).

*Primary Examiner* — Mark Hellner
*Assistant Examiner* — Redhwan Mawari
(74) *Attorney, Agent, or Firm* — Oliff & Berridge, PLC

(57) ABSTRACT

A control apparatus for a vehicular drive system including an electrically controlled differential portion having a differential mechanism, and an electric motor which is operatively connected to the differential mechanism and an operating state of which is controlled to control a differential state between input and output shaft speeds, and a transmission portion constituting a part of a power transmitting path between the differential portion and a vehicle drive wheel, the control apparatus including a differential-state switching portion for switching the differential portion between differential-state and non-differential states, a shifting control portion for controlling a shifting action of the transmission portion, and a learning control portion for effecting learning compensation of a control amount of a control element to be controlled during the shifting action, wherein the learning control portion includes a differential-state learning control portion operable to implement the learning compensation of the control amount of the control element when the shifting action takes place in the differential state of the differential portion, and a non-differential-state learning control portion operable to implement the learning compensation when the shifting action takes place in the non-differential state of the differential portion, and the shifting control portion controls the shifting action in a presently selected one of the differential and non-differential states of the differential portion, on the basis of the learning compensation implemented by one of the differential-state and non-differential-state learning control portions which is operable in the other of the differential and non-differential states of the differential portion.

17 Claims, 12 Drawing Sheets

U.S. PATENT DOCUMENTS

| | | | |
|---|---|---|---|
| 7,678,014 B2 * | 3/2010 | Nohara et al. | 477/15 |
| 7,771,309 B2 * | 8/2010 | Kamada et al. | 477/3 |
| 2009/0088290 A1 | 4/2009 | Tabata et al. | |
| 2009/0248265 A1 | 10/2009 | Tabata et al. | |

FOREIGN PATENT DOCUMENTS

| | | |
|---|---|---|
| JP | A 2006-9942 | 1/2006 |
| JP | A-2006-321390 | 11/2006 |
| JP | A-2006-321391 | 11/2006 |

* cited by examiner

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | SPREAD 4.76 |
| R | | | ○ | | | | ○ | 3.209 | |
| N | ○ | | | | | | | | |

○ ENGAGED

◎ ENGAGED FOR STEP-VARIABLE SHIFTING, AND RELEASED FOR CONTINUOUSLY-VARIABLE SHIFTING

RACING AMOUNT GNIN OF INPUT SHAFT
OF STEP-VARIABLE TRANSMISSION PORTION 20

TORQUE REDUCTION AMOUNT DTM2
OF SECOND ELECTRIC MOTOR M2
(REDUCTION AMOUNT X REDUCTION TIME)

REACTION TORQUE REDUCTION AMOUNT DTM1
OF FIRST ELECTRIC MOTOR M1
(REDUCTION AMOUNT X REDUCTION TIME)

|  | C0 | C1 | C2 | B0 | B1 | B2 | SPEED RATIO | STEPPING RATIO |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | SPREAD 3.977 |
| R |  |  | ○ |  |  | ○ | 2.393 |  |
| N | ○ |  |  |  |  |  |  |  |

○ ENGAGED

◎ ENGAGED FOR STEP-VARIABLE SHIFTING, AND RELEASED FOR CONTINUOUSLY-VARIABLE SHIFTING

\# CONTROL APPARATUS FOR VEHICULAR DRIVE SYSTEM

The present application claims priority from Japanese Patent Application No. 2007-071339 filed Mar. 19, 2007, the disclosure of which is herein incorporated by reference in its entirety.

BACKGROUND OF THE INVENTION

1. Field of the Invention

The present invention relates in general to a control apparatus for a vehicular drive system, and more particularly to shifting control of the vehicular drive system by the control apparatus according to a selected one of two different operating states of the vehicular drive system.

2. Discussion of Prior Art

There is known a control apparatus for a vehicular drive system including an electrically controlled differential portion, a transmission portion, and a differential-state switching device configured to switch a differential mechanism of the electrically controlled differential portion between a differential-state in which the differential portion is operable to perform a differential function, and a non-differential state in which the differential portion is not operable to perform the differential function. JP-2006-9942 A discloses an example of such a vehicular drive system control apparatus. In a vehicular drive system as disclosed in the above-identified publication, the differential mechanism is constituted by a planetary gear set, for example, and a major portion of a drive force of an engine is mechanically transmitted to drive wheels of a vehicle owing to the differential function of the planetary gear set, while the remaining portion of the drive force of the engine is transmitted to a first electric motor from which an electric energy is transmitted to a second electric motor through an electric path therebetween, so that the planetary gear set functions as the electrically controlled differential portion in which the differential state between the rotating speeds of the input and output shafts is electrically variable. The vehicular drive system is controlled by the control apparatus to drive the vehicle with the engine held in an optimum operating state to maximize the fuel economy of the vehicle. The vehicular drive system disclosed in the publication is provided with a step-variable automatic transmission disposed between the output shaft of the differential mechanism and the drive wheels, for the purpose of minimizing the required size of the second electric motor.

A step-variable transmission is provided with a plurality of coupling devices which are selectively engaged and released to perform a shifting action of the step-variable transmission. In the presence of variations of the step-variable transmission with respect to nominal specification, the step-variable transmission has a risk of generation of a shifting shock if the shifting action is performed at a nominal point of shifting. To prevent or reduce this risk of shifting shock, a learning control of the shifting action of the step-variable transmission is widely implemented. For instance, the learning control involves a control of engaging pressures of the coupling devices and/or a control of timings of engaging and releasing actions of the coupling devices in a transient state of the shifting action of the step-variable transmission, depending upon a specific running condition of the vehicle such as an input torque of the step-variable transmission.

Such a learning control for reducing the shifting shock is preferably implemented for the transmission portion of the vehicular drive system including the above-described electrically controlled differential portion as well as the transmission portion. As described above, the electrically controlled differential portion has the two operating states, that is, the differential state and the non-differential state, so that the vehicular drive system as a whole has two operating states corresponding to the two operating states of the differential portion. If the learning control of the shifting action of the transmission portion is implemented in a predetermined manner irrespective of the presently selected one of the differential and non-differential states of the differential portion, that is, without taking account of the presently established differential or non-differential state of the differential portion, the learning control does not necessarily prevent or reduce the risk of shifting shock of the transmission portion, due to a difference between the differential and non-differential states of the electrically controlled differential portion.

If the learning control is implemented in different manners suitable for the respective differential operating states of the vehicular drive system as a whole, the learning control provides a better result in the prevention or reduction of the shifting shock, than the learning control implemented in the predetermined single manner irrespective of the operating states of the vehicular drive system. In this case, however, the manner of the learning control frequently changes upon a change of the operating state from one state to the other, so that the time allowed for each opportunity of the learning control tends to be short, giving rise to a requirement for a long length of time for a satisfactory or successful result of the learning control, whereby the transmission portion may suffer from a shifting shock until the satisfactory result of the learning control is obtained.

SUMMARY OF THE INVENTION

The present invention was made in view of the background art described above. It is therefore an object of the present invention to provide a control apparatus for a vehicular drive system including an electrically controlled differential portion switchable between a differential state and a non-differential state, and a transmission portion having a plurality of coupling devices, which control apparatus comprises a differential-state switching portion to switch the differential portion between the differential and non-differential states, a shifting control portion to control a shifting action of the transmission portion, and a learning control portion to effect learning compensation of a control amount of a control element to be controlled during the shifting action of the transmission portion, the control apparatus being configured to implement a learning control of the shifting action depending upon a selected one of the differential and non-differential states of the differential portion, and to implement an adequate control of the shifting action of the transmission portion so as to prevent or reduce a risk of generation of a shifting shock of the transmission portion even in the event of a failure or insufficiency of the learning control.

The object indicated above may be achieved according to any one of the following modes of this invention, each of which is numbered and depends from the other mode or modes, where appropriate, to indicate and clarify possible combinations of elements or technical features. It is to be understood that the present invention is not limited to the technical features or any combination thereof which will be described for illustrative purpose only.

(1) A control apparatus for a vehicular drive system including (a) an electrically controlled differential portion having an input shaft, an output shaft, a differential mechanism, and an electric motor which is operatively connected to a rotary element of the differential mechanism and an operating state of which is controlled to control a differential state between rotating speeds of the input and output shafts, and (b) a transmission portion which constitutes a part of a power transmitting path between the differential portion and a drive wheel of a vehicle, the control apparatus comprising (i) a differential-state switching portion configured to switch the differential portion between a differential-state in which the differential portion is operable to perform a differential function, and a non-differential state in which the differential portion is not operable to perform the differential function, (ii) a shifting control portion configured to control a shifting action of the transmission portion, and (iii) a learning control portion configured to effect learning compensation of a control amount of a control element to be controlled during the shifting action of the transmission portion, wherein the learning control portion includes a differential-state learning control portion operable to implement the learning compensation of the control amount of the control element when the shifting action of the transmission portion takes place in the differential state of the electrically controlled differential portion, and a non-differential-state learning control portion operable to implement the learning compensation of the control amount when the shifting action takes place in the non-differential state of the electrically controlled differential portion, and the shifting control portion is configured to control the shifting action of the transmission portion in a presently selected one of the differential and non-differential states of the electrically controlled differential portion, on the basis of the learning compensation which has been implemented by one of the differential-state and non-differential-state learning control portions which is operable in the other of the differential and non-differential states of the electrically controlled differential portion.

According to the control apparatus constructed according to the principle of the present invention, the differential-state learning control portion of the learning control portion is operable to implement the learning compensation of the control amount of the control element when the shifting action of the transmission portion takes place in the differential state of the electrically controlled differential portion, while the non-differential-state learning control portion of the learning control potion is operable to implement the learning compensation of the control amount when the shifting action takes place in the non-differential state of the electrically controlled differential portion. The shifting control portion 54 is configured to control the shifting action of the transmission portion in a presently selected one of the differential and non-differential states of the electrically controlled differential portion, on the basis of the learning compensation which has been implemented by one of the differential-state and non-differential-state learning control portions which is operable in the other of the differential and non-differential states of the electrically controlled differential portion. Accordingly, the control amount of the control element to be controlled during the shifting action of the transmission portion is controlled adequately on the basis of the learning compensation which has been implemented by the differential-state or non-differential state learning control portion which is operable in the state of the electrically controlled differential portion which is different from the presently selected state in which the shifting action of the transmission portion takes place. Thus, the control amount is controlled so as to prevent or reduce the risk of generation of a shifting shock of the transmission portion.

(2) The control apparatus according to the above-described mode (1), further comprising a control-amount calculating portion configured to calculate the control amount of the control element in the above-described other of the differential and non-differential states of the electrically controlled differential portion, on the basis of the learning compensation implemented by one of the differential-state and non-differential-state learning control portions which is operable in the presently selected one of the differential and non-differential states of the electrically controlled differential portion, wherein the shifting control portion controls the shifting action of the transmission portion in the presently selected state of the electrically controlled differential portion, on the basis of the control amount of the control element calculated by the control-amount calculating portion.

In the above-described mode (2) of the invention, the shifting action of the transmission portion in the presently selected state (differential or non-differential state) of the electrically controlled differential portion (differential mechanism) is controlled adequately so as to reduce the risk of generation of the shifting shock of the transmission portion, on the basis of the control amount calculated by the control-amount calculating portion in the other state of the electrically controlled differential portion (differential mechanism). Accordingly, even in the event of failure of the learning of the control amount by the learning control portion in the above-indicated other state of the electrically controlled differential portion, the shifting action can be controlled adequately so as to reduce the risk of generation of the shifting shock of the transmission portion. Although the adequate control amount of the control element controlled during the shifting action of the transmission portion changes depending upon the differential mechanism of the electrically controlled differential portion is placed in the differential state or the non-differential state, the shifting action in the presently selected state of the differential mechanism can be adequately controlled on the basis of the control amount calculated by the control-amount calculating portion in the non-selected state of the differential mechanism, since the tendency of the learning compensation in the differential-state of the differential mechanism is similar to that in the non-differential state.

(3) The control apparatus according to the above-described mode (2), wherein the learning control portion further includes a learning-sufficiency detecting portion configured to determine whether sufficient learning of the control amount of the control element has been effected by one of the differential-state and non-differential-state learning control portions which is operable in the presently selected one of the differential and non-differential states of the electrically controlled differential portion, and the shifting control portion controls the shifting action of the transmission portion in the presently selected state of the electrically controlled differential portion on the basis of the control amount of the control element calculated by the control-amount calculating portion, if the learning-sufficiency detecting portion determines that the sufficient learning of the control amount has not been effected by the above-indicated one of the differential-state and non-differential-state learning control portions. In the above-described mode (3) of the invention, the shifting control portion controls the shifting action of the transmission portion in the presently selected state of the electrically controlled differential portion on the basis of the control amount of the control element calculated by the control-amount calculating portion, if the learning-sufficiency detecting portion determines that that the sufficient learning of the control amount has not been effected by the differential-state or non-differential-state learning control portion which is operable in the presently selected state of the electrically controlled differential portion. Accordingly, the shifting action of the transmission portion in the presently selected differential or non-differential state of the electrically controlled differential is controlled adequately so as to reduce the risk of generation of the shifting shock of the transmission portion, on the basis of the control amount calculated by the control-amount calculating portion in the other state of the continuously-variable transmission portion, even if the learning of the control amount by the differential-state or non-differential-state learning control portion operable in the presently selected state of the electrically controlled differential portion is insufficient or has not been effected at all.

(4) The control apparatus according to the above-described mode (2) or (3), wherein the differential-state switching portion places the electrically controlled differential portion in the differential state when the vehicle is running at a relatively low speed or with a relatively small drive torque, and in the non-differential state when the vehicle is running at a relatively high speed or with a relatively large drive torque, and the control-amount calculating portion calculates the control amount of the control element in the non-differential state of the electrically controlled differential portion, on the basis of the learning compensation of the control amount implemented by the differential-state learning control portion in the differential state of the electrically controlled differential portion, the shifting control portion controlling the shifting action of the transmission portion in the presently selected non-differential state of the electrically controlled differential portion, on the basis of the control amount calculated by the control-amount calculating portion in the differential state of the electrically controlled differential portion.

In the above-described mode (4) of this invention, the electrically controlled differential portion is more frequently placed in the differential state, than in the non-differential state, under the control of the differential-state switching portion, so that the learning compensation of the control amount is frequently implemented by the differential-state learning control portion in the differential state, whereby the learning compensation by the differential-state learning control portion progresses more rapidly than the learning compensation by the non-differential-state learning control portion. The shifting control portion controls the shifting action of the transmission portion in the presently selected non-differential state of the electrically controlled differential portion, on the basis of the control amount which is calculated by the control-amount calculating portion in the differential state of the electrically controlled differential portion on the basis of the learning compensation of the control amount frequently implemented by the differential-state learning control portion in the differential state of the electrically controlled differential portion. Therefore, the shifting action in the non-differential state in which the learning compensation by the non-differential-state learning control portion is relatively infrequently implemented can be controlled so as to prevent or reduce the risk of generation of the shifting shock of the transmission portion.

(5) The control apparatus according to any one of the above-described modes (1)-(4), wherein the transmission portion is a step-variable automatic transmission portion.

In the above-described mode (5) of the invention applied to the vehicular drive system provided with the step-variable automatic transmission portion, the vehicle has a higher degree of fuel economy than where the vehicular drive system is provided with a continuously-variable transmission portion.

(6) The control apparatus according to the above-described mode (5), wherein the control element is a coupling device operated to perform the shifting action of the step-variable automatic transmission portion, and the control amount is an engaging pressure of the coupling device, the learning control portion effecting the learning compensation of the engaging pressure of the coupling device, on the basis of a change of a parameter indicative of an input shaft speed of the step-variable automatic transmission portion in a transient state of the shifting action.

In the above-described mode (6) of the invention, the engaging pressure of the coupling device of the step-variable automatic transmission portion is controlled so as to prevent or reduce the risk of generation of the shifting shock, according to the learning compensation of the engaging pressure implemented on the basis of the change of the parameter indicative of the input shaft speed of the transmission portion in the transient state of the shifting action, which change reflects a state of the shifting action such as an entry into an inertia phase, so that the learning compensation can be effected accurately, assuring adequate control of the shifting action.

(7)) The control apparatus according to the above-described mode (5), wherein the control element is a coupling device operated to perform the shifting action of the step-variable automatic transmission portion, and the control amount is an engaging pressure of the coupling device, the learning control portion effecting the learning compensation of the engaging pressure of the coupling device, on the basis of a change of a parameter indicative of an input torque of the step-variable automatic transmission portion in a transient state of the shifting action.

In the above-described mode (7) of the invention, the engaging pressure of the coupling device of the step-variable automatic transmission portion is controlled so as to prevent or reduce the risk of generation of the shifting shock, according to the learning compensation of the engaging pressure implemented on the basis of the change of the parameter indicative of the input torque of the transmission portion in the transient state of the shifting action. In this respect, it is noted that the input torque of the transmission portion is controlled by controlling an engine or the electric motor, so as to prevent an excessive rise (racing) or an excessive drop of a parameter indicative of the input shaft speed of the transmission portion, which would take place due to an inadequate control of the engaging pressure. Accordingly, the input torque of the transmission portion reflects an adequate or inadequate control of the engaging pressure of the coupling device during the shifting action of the transmission portion, so that the learning compensation of the engaging pressure can be accurately effected on the basis of the parameter indicative of the input torque of the transmission portion.

(8) The control apparatus according to the above-described mode (7), wherein the vehicular drive system further includes an engine, and a power transmitting member connecting the differential mechanism and the transmission portion, and the electrically controlled differential portion includes a first electric motor to which an output of the engine is distributed through the differential mechanism, and a second electric motor connected to the power transmitting member, and wherein the parameter indicative of the input torque of the transmission portion is a parameter indicative of a sum of an output torque of the differential mechanism and an output torque of the second electric motor.

In the above-described mode (8) of the invention, the input torque of the step-variable automatic transmission portion is a sum of the output torque of the differential mechanism and the output torque of the second electric motor, so that the input torque of the transmission portion can be easily controlled.

(9) The control apparatus according to the above-described mode (7), wherein the vehicular drive system further includes an engine, and a power transmitting member connecting the differential mechanism and the transmission portion, and the electrically controlled differential portion includes a first electric motor to which an output of the engine is distributed through the differential mechanism, and a second electric motor disposed in a power transmitting path between the power transmitting member and the drive wheel of the vehicle, and wherein the parameter indicative of the input torque of the transmission portion is calculated on the basis of a reaction torque of the first electric motor in the differential state of the electrically controlled differential portion.

In the above-described mode (9) of the invention, the parameter indicative of the input torque of the step-variable automatic transmission portion is calculated on the basis of the reaction torque of the first electric motor which is included in the electrically controlled differential portion and to which the output of the engine is distributed through the differential mechanism, so that the input torque of the transmission portion can be easily controlled.

(10) The control apparatus according to any one of the above-described modes (1)-(9), further comprising a learning abnormality detecting portion configured to detect an abnormality relating to the learning compensation of the control amount of the control element by the learning control portion, when there exists a difference between results of learning of the control amount by the differential-state and non-differential-state learning control portions operable in the respective differential and non-differential states of the electrically controlled differential portion. In this case, the learning control portion inhibits or restrict an operation of the control-amount calculating portion when the learning abnormality detecting portion has detected the abnormality.

In the above-described mode (10) of this invention, abnormal learning compensation of the control amount by the learning control portion can be avoided when the learning abnormality detecting portion has detected an abnormality relating to the learning compensation of the learning control portion, that is, when there is a large difference between the results of learning of the control amount by the differential-state and non-differential-state learning control portions. Although an adequate value of the control amount of the control element to be controlled during the shifting action of the transmission portion differs depending upon whether the electrically controlled differential portion is placed in the differential state or in the non-differential state, the amounts of the learning compensation by the differential-state and non-differential-state learning control portions have the same tendency of change. Therefore, the learning abnormality detecting portion can detect an abnormality relating to the learning compensation of the control amount by the learning control portion, when the amounts of the learning compensation by the differential-state and non-differential-state learning control portions in the differential and non-differential states of the electrically controlled differential portion have different tendencies of change.

(11) The control apparatus according to any one of the above-described modes (1)-(10), further comprising a hybrid control portion configured to control an operating state of the electric motor such that the electrically controlled differential portion is operable as a continuously-variable transmission mechanism.

In the above-described mode (11) of the present invention, the electrically controlled differential portion can be operated as a continuously-variable transmission mechanism with the operating state of the electric motor being suitably controlled by the hybrid control portion, so that during the shifting action of the transmission portion, the vehicular drive system as a whole is operable as a continuously variable transmission when a speed ratio of the electrically controlled differential portion is continuously changed in a direction opposite to a direction of change of a speed ratio of the transmission portion.

(12) The control apparatus according to the above-described mode (2), wherein the control-amount calculating portion calculates the control amount of the control element in the above-indicated other of the differential and non-differential states of the electrically controlled differential portion, on the basis of a tendency of change of the learning compensation implemented by the above-indicated one of the differential-state and non-differential-state learning control portions which is operable in the presently selected one of the differential and non-differential states of the electrically controlled differential portion, In this mode of the invention, a difference between the results of learning of the control amount by the differential-state and non-differential-state learning control portions can be easily detected or confirmed simply by reference to the tendency of change of the learning compensation in the presently selected differential or non-differential state of the electrically controlled differential portion, rather to the amount of the learning compensation.

(13) The control apparatus according to any one of the above-described modes (2)-(4), wherein the transmission portion is provided with two coupling devices which are respectively released and engaged concurrently to perform the shifting action, and the learning control portion effects the learning compensation of the control amounts of the two coupling devices in the process of releasing and engaging actions thereof.

In the above-described mode (13) of this invention, the shifting action of the transmission portion can be controlled with a high control response, so as to prevent or reduce the risk of generation of the shifting shock, by learning compensation of the control amounts of the two coupling devices in the process of the concurrent releasing and engaging actions by the learning control portion

BRIEF DESCRIPTION OF THE DRAWINGS

The above and other objects, features, advantages, and industrial and technical significance of this invention will be better understood by reading the following detailed description of a preferred embodiment of the invention, when considered in connection with the following drawings, in which.

DETAILED DESCRIPTION OF PREFERRED EMBODIMENT

Figures 1, 2:
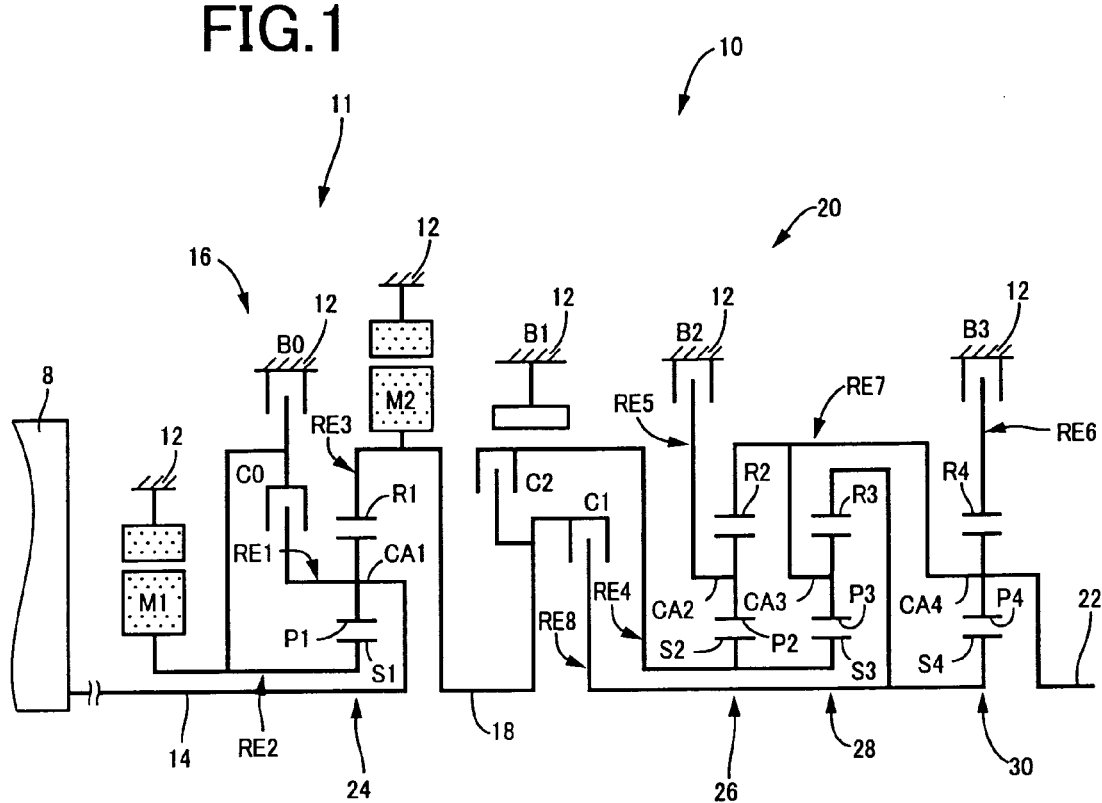
FIG. 1 is a schematic view showing an arrangement of a drive system (transmission mechanism) of a hybrid vehicle, to which the present invention is applicable.
FIG. 2 is a table indicating shifting actions of the hybrid vehicle drive system of FIG. 1, which is operable in a selected one of a continuously-variable shifting state and a step-variable shifting state, in relation to different combinations of operating states of hydraulically operated frictional coupling devices to effect the respective shifting actions.
Figure 5:
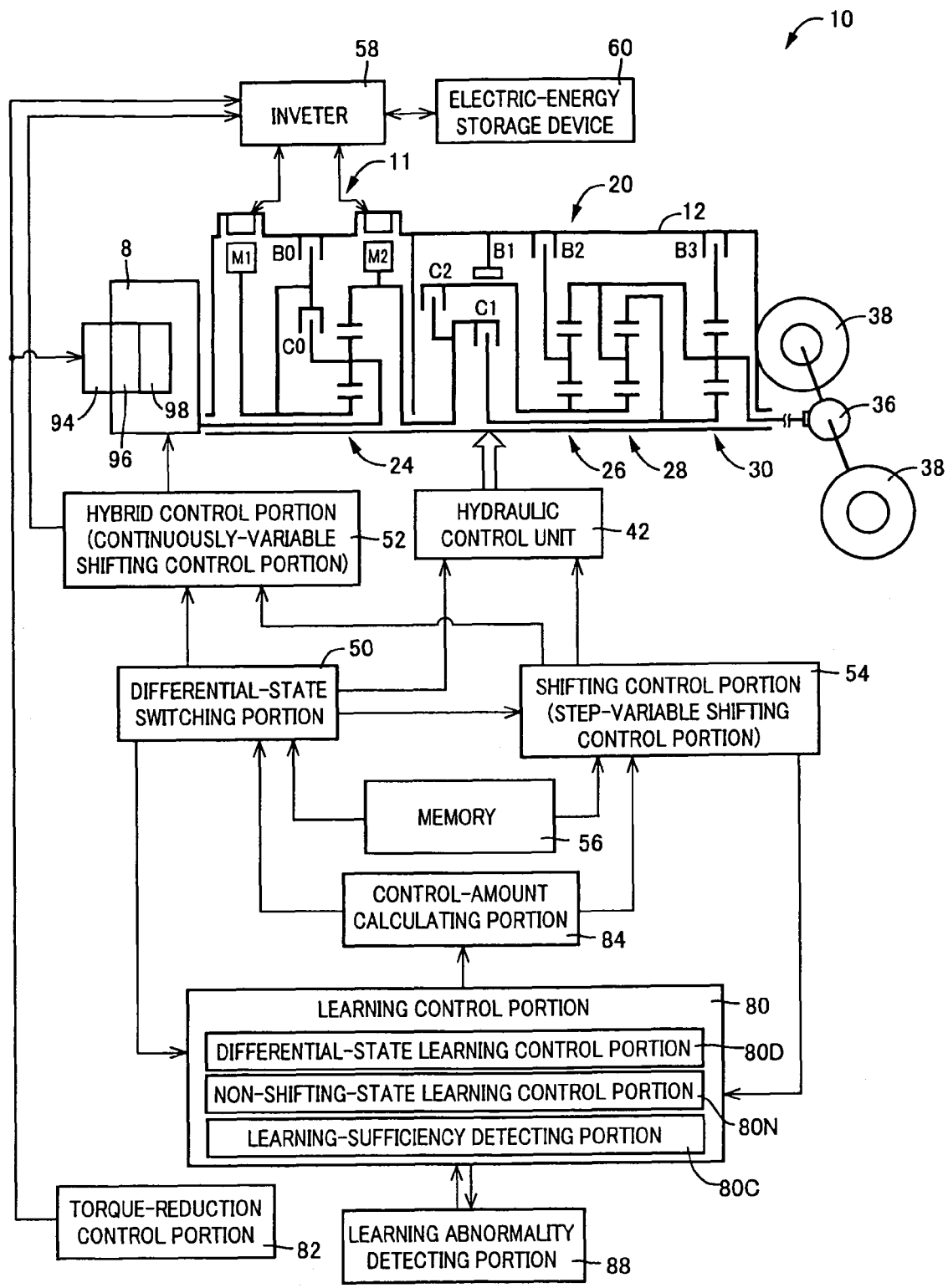
FIG. 5 is a functional block diagram illustrating major control functions of the electronic control device of FIG. 4.

Referring first to the schematic view of FIG. 1, there is shown a transmission mechanism 10 constituting a part of a drive system for a hybrid vehicle, which drive system is controlled by a control apparatus constructed according to one embodiment of this invention. In FIG. 1, the transmission mechanism 10 includes: an input rotary member in the form of an input shaft 14; an electrically controlled differential portion in the form of a continuously-variable transmission portion 11 connected to the input shaft 14 either directly, or indirectly via a pulsation absorbing damper (vibration damping device) not shown; a step-variable or multiple-step transmission portion in the form of a step-variable transmission portion 20 disposed between the continuously-variable transmission portion 11 and drive wheels 38 of the vehicle, and connected in series via a power transmitting member 18 (power transmitting shaft) to the transmission portion 11 and the drive wheels 38; and an output rotary member in the form of an output shaft 22 connected to the step-variable transmission portion 20. The input shaft 12, continuously-variable transmission portion 11, step-variable transmission portion 20 and output shaft 22 are coaxially disposed on a common axis in a casing 12 (hereinafter referred to as casing 12) functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 38, to transmit a vehicle drive force from the engine 8 to the pair of drive wheels 38 through a differential gear device 36 (final speed reduction gear) and a pair of drive axles, as shown in FIG. 5. The engine 8 may be a gasoline engine or diesel engine and functions as a vehicle drive power source directly connected to the input shaft 14 or indirectly via a pulsation absorbing damper. It is noted that a lower half of the transmission mechanism 10, which is constructed symmetrically with respect to its axis, is omitted in FIG. 1.

The continuously-variable transmission portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is rotated with the output shaft 22. The second electric motor M2 may be disposed at any portion of the power transmitting path between the power transmitting member 18 and the drive wheels 38. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as major components, a first planetary gear set 24 of a single pinion type having a gear ratio r1 of about 0.418, for example, a switching clutch C0 and a switching brake B1. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio r1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, the power distributing mechanism 16 is placed in a differential state in which three elements of the first planetary gear set 24 consisting of the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Accordingly, the power distributing mechanism 16 is placed in the continuously-variable shifting state (electrically established CVT state), in which the rotating speed of the power transmitting member 18 is continuously variable, irrespective of the rotating speed of the engine 8, namely, placed in the differential state in which a speed ratio g0 (rotating speed of the input shaft 14/rotating speed of the power transmitting member 18) of the power distributing mechanism 16 is continuously changed from a minimum value g0 min to a maximum value g0 max, that is, in the continuously-variable shifting state in which the power distributing mechanism 16 functions as an electrically controlled continuously variable transmission the speed ratio g0 of which is continuously variable from the minimum value g0 min to the maximum value g0 max.

When the switching clutch C0 or brake B0 is engaged while the power distributing mechanism 16 is placed in the continuously-variable shifting state, the power distributing mechanism 16 is brought into a locked state or non-differential state in which the differential function is not available. Described in detail, when the switching clutch C0 is engaged, the first sun gear S1 and the first carrier CA1 are connected together, so that the power distributing mechanism 16 is placed in the locked state in which the three rotary elements of the first planetary gear set 24 consisting of the first sun gear S1, first carrier CA1 and first ring gear R1 are rotatable as a unit, namely, placed in a non-differential state in which the differential function is not available, so that the continuously-variable transmission portion 11 is also placed in a non-differential state. In this non-differential state, the rotating speed of the engine 8 and the rotating speed of the power transmitting member 18 are made equal to each other, so that the continuously-variable transmission portion 11 (power distributing mechanism 16) is placed in a fixed-speed-ratio shifting state or step-variable shifting state in which the mechanism 16 functions as a transmission having a fixed speed ratio g0 equal to 1.

When the switching brake B0 is engaged in place of the switching clutch C0, the first sun gear S1 is fixed to the casing 12, so that the power distributing mechanism 16 is placed in the locked state in which the first sun gear S1 is not rotatable, namely, placed in a second non-differential state in which the differential function is not available, so that the continuously-variable transmission portion 11 is also placed in the non-differential state. Since the rotating speed of the first ring gear R1 is made higher than that of the first carrier CA1, the continuously-variable transmission portion 11 is placed in the fixed-speed-ratio shifting state or step-variable shifting state in which continuously-variable transmission portion 11 (the power distributing mechanism 16) functions as a speed-increasing transmission having a fixed speed ratio g0 smaller than 1, for example, about 0.7.

Thus, the frictional coupling devices in the form of the switching clutch C0 and brake B0 function as a differential-state switching device operable to selectively switch the continuously-variable transmission portion 11 (power distributing mechanism 16) between the differential state (namely, non-locked state) and the non-differential state (namely, locked state), that is, between the continuously-variable shifting state in which the continuously-variable transmission portion 11 (the power distributing mechanism 16) is operable as an electrically controlled continuously variable transmission the speed ratio of which is continuously variable, and the locked state in which the continuously-variable transmission portion 11 is not operable as the electrically controlled continuously variable transmission capable of performing a continuously-variable shifting operation, and in which the speed ratio of the transmission portion 11 is held fixed, namely, the fixed-speed-ratio shifting state (non-differential state) in which the transmission portion 11 is operable as a transmission having a single gear position with one speed ratio or a plurality of gear positions with respective speed ratios, namely, the fixed-speed-ratio shifting state in which the transmission portion 11 is operated as a transmission having a single gear position with one speed ratio or a plurality of gear positions with respective speed ratios.

The step-variable transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio r2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio r3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio r4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios r2, r3 and r4 are represented by ZS2/ZR2. ZS3/ZR3, and ZS4/ZR4, respectively.

In the step-variable transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, one of a first gear position (first speed position) through a fifth gear position (fifth speed position), a reverse gear position (rear drive position) and a neural position is selectively established by engaging actions of a corresponding combination of the two frictional coupling devices selected from the above-described first clutch C1, second clutch C2, first brake B1, second brake B2 and third brake B3, as indicated in the table of FIG. 2. The above-indicated positions have respective speed ratios gT (input shaft speed NIN/output shaft speed NOUT) which change as geometric series. In the present embodiment, the power distributing mechanism 16 is provided with the switching clutch C0 and the switching brake B0 one of which is engaged to place the continuously-variable transmission portion 11 in the continuously-variable shifting state in which the continuously-variable transmission portion 11 is operable as a continuously variable transmission, or in the step-variable shifting state (fixed-speed-ratio shifting state) in which the continuously-variable transmission portion 11 is operable as a step-variable transmission having a fixed speed ratio or ratios. In the present transmission mechanism 10, therefore, the continuously-variable transmission portion 11 placed in the fixed-speed-ratio shifting state by the engaging action of one of the switching clutch C0 and switching brake B0 cooperates with the step-variable transmission portion 20 to constitute a step-variable transmission device, while the continuously-variable transmission portion 11 placed in the continuously-variable shifting state with the switching clutch C0 and switching brake B0 being both held in the released state cooperates with the step-variable transmission portion 20 to constitute an electrically controlled continuously variable transmission device. In other words, the transmission mechanism 10 is placed in its step-variable shifting state by engaging one of the switching clutch C0 and switching brake B9, and in its continuously-variable shifting state by releasing both of the switching clutch C0 and switching brake B0. Similarly, the continuously-variable transmission portion 11 is selectively placed in one of its step-variable and continuously-variable shifting states.

Where the transmission mechanism 10 functions as the step-variable transmission, for example, the first gear position having the highest speed ratio g1 of about 3.357, for example, is established by engaging actions of the switching clutch C0, first clutch C1 and third brake B3, and the second gear position having the speed ratio g2 of about 2.180, for example, which is lower than the speed ratio g1, is established by engaging actions of the switching clutch C0, first clutch C1 and second brake B2, as indicated in FIG. 2. Further, the third gear position having the speed ratio g3 of about 1.424, for example, which is lower than the speed ratio g2, is established by engaging actions of the switching clutch C0, first clutch C1 and first brake B1, and the fourth gear position having the speed ratio g4 of about 1.000, for example, which is lower than the speed ratio g3, is established by engaging actions of the switching clutch C0, first clutch C1 and second clutch C2. The fifth gear position having the speed ratio g5 of about 0.705, for example, which is smaller than the speed ratio g4, is established by engaging actions of the first clutch C1, second clutch C2 and switching brake B0. Further, the reverse gear position having the speed ratio gR of about 3.209, for example, which is intermediate between the speed ratios g1 and g2, is established by engaging actions of the second clutch C2 and the third brake B3. The neutral position N is established by engaging only the switching clutch C0.

Where the transmission mechanism 10 functions as the continuously-variable transmission, on the other hand, the switching clutch C0 and the switching brake B0 indicated in FIG. 2 are both released, so that the continuously-variable transmission portion 11 functions as the continuously variable transmission, while the step-variable transmission portion 20 connected in series to the continuously-variable transmission portion 11 functions as the step-variable transmission, whereby the speed of the rotary motion transmitted to the step-variable transmission portion 20 placed in a selected one of the first, second, third and fourth gear positions, namely, the rotating speed of the power transmitting member 18 is continuously changed, so that the speed ratio of the drive system when the step-variable transmission portion 20 is placed in the selected gear position is continuously variable over a predetermined range. Accordingly, the overall speed ratio gT of the transmission mechanism 10 determined by the speed ratio g0 of the continuously-variable transmission portion 11 and the speed ratio g of the step-variable transmission portion 20 is continuously variable.

Figure 3:
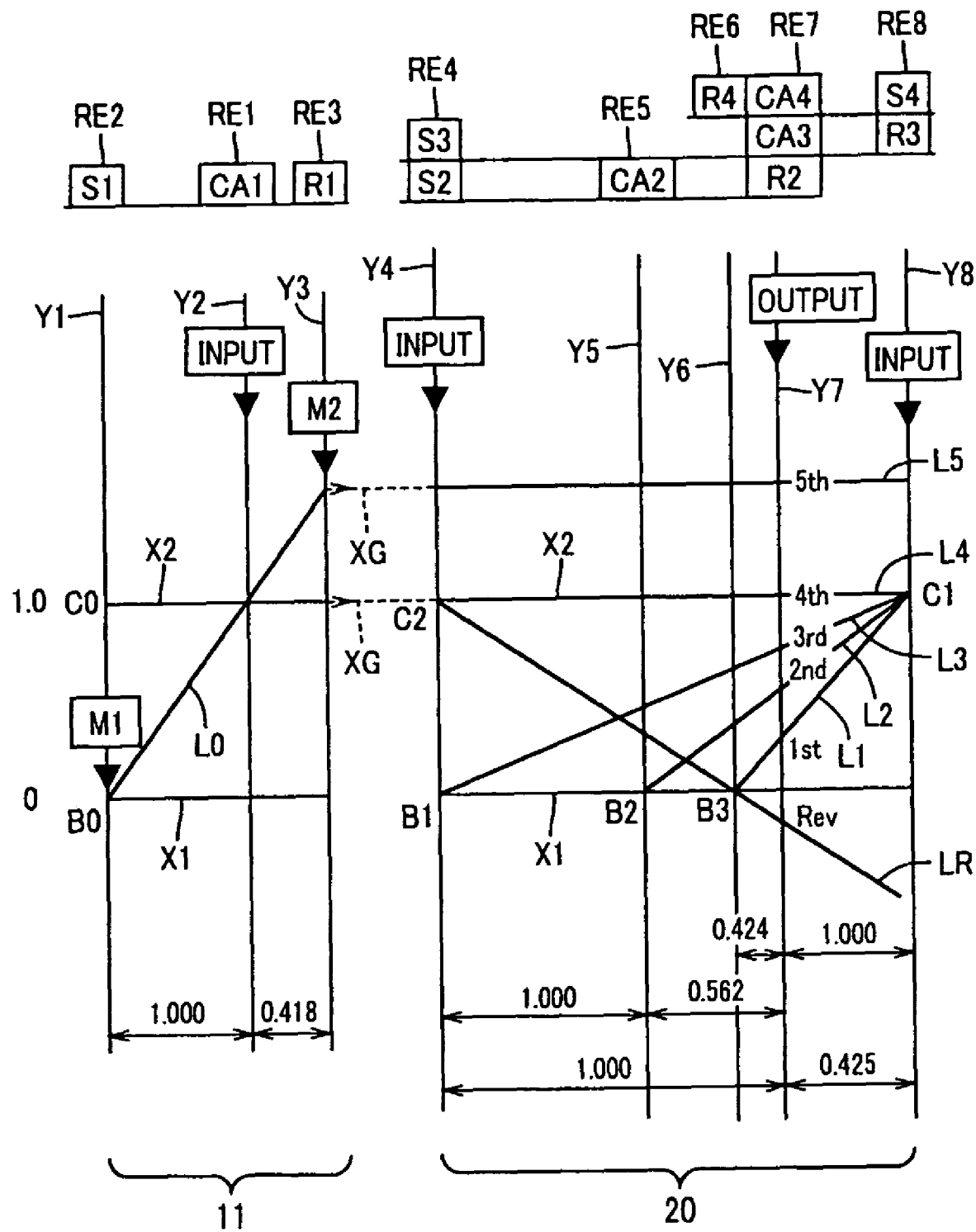
FIG. 3 is a collinear chart indicating relative rotating speeds of the hybrid vehicle drive system of FIG. 1 operated in the step-variable shifting state, in different gear positions of the drive system.

The collinear chart of FIG. 3 indicates, by straight lines, a relationship among the rotating speeds of the rotary elements in each of the gear positions of the transmission mechanism 10, which is constituted by the continuously-variable transmission portion 11 functioning as the continuously-variable shifting portion or first shifting portion, and the step-variable transmission portion 20 functioning as the step-variable shifting portion (step-variable transmission portion) or second shifting portion. The collinear chart of FIG. 3 is a rectangular two-dimensional coordinate system in which the gear ratios r of the planetary gear sets 24, 26, 28, 30 are taken along the horizontal axis, while the relative rotating speeds of the rotary elements are taken along the vertical axis. A lower one of three horizontal lines, that is, the horizontal line X1 indicates the rotating speed of 0, while an upper one of the three horizontal lines, that is, the horizontal line X2 indicates the rotating speed of 1.0, that is, an operating speed NE of the engine 8 connected to the input shaft 14. The horizontal line XG indicates the rotating speed of the power transmitting member 18.

Three vertical lines Y1, Y2 and Y3 corresponding to the power distributing mechanism 16 of the continuously-variable transmission portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio r1 of the first planetary gear set 24. That is, the distance between the vertical lines Y1 and Y2 corresponds to "1", while the distance between the vertical lines Y2 and Y3 corresponds to the gear ratio r1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios r2, r3 and r4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio r. In the continuously-variable transmission portion 11, the distance between the vertical lines Y1 and Y2 corresponds to "1", while the distance between the vertical lines Y2 and Y3 corresponds to the gear ratio r. In the step-variable transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio r.

Referring to the collinear chart of FIG. 3, the power distributing mechanism 16 (continuously-variable transmission portion 11) of the transmission mechanism 10 is arranged such that the first rotary element RE1 (first carrier CA1) of the first planetary gear set 24 is integrally fixed to the input shaft 14 (engine 8) and selectively connected to the second rotary element RE2 (first sun gear S1) through the switching clutch C0, and this second rotary element RE2 is fixed to the first electric motor M1 and selectively fixed to the casing 12 through the switching brake B0, while the third rotary element RE3 (first ring gear R1) is fixed to the power transmitting member 18 and the second electric motor M2, so that a rotary motion of the input shaft 14 is transmitted (input) to the step-variable transmission portion 20 through the power transmitting member 18. A relationship between the rotating speeds of the first sun gear S1 and the first ring gear R1 is represented by an inclined straight line L0 which passes a point of intersection between the lines Y2 and X2.

When the transmission mechanism 10 is brought into the continuously-variable shifting state (differential state) by releasing actions of the switching clutch C0 and brake B0, for instance, the rotating speed of the first sun gear S1 represented by a point of intersection between the straight line L0 and the vertical line Y1 is raised or lowered by controlling the operating speed of the first electric motor M1, so that the rotating speed of the first carrier CA1 represented by the straight line L0 and the vertical line Y2 is raised or lowered. When the switching clutch C0 is engaged, the first sun gear S1 and the first carrier CA1 are connected to each other, and the power distributing mechanism 16 is placed in the non-differential state in which the above-indicated three rotary elements are rotated as a unit, so that the straight line L0 is aligned with the horizontal line X2, and the power transmitting member 18 is rotated at a speed equal to the engine speed NE. When the switching brake B0 is engaged, on the other hand, the rotary motion of the first sun gear S1 is stopped, and the power distributing mechanism 16 is placed in the non-differential state in which the power distributing mechanism 16 functions as a speed increasing mechanism, so that the straight line L0 is inclined in the state indicated in FIG. 3, whereby the rotating speed of the first ring gear R1 represented by a point of intersection between the straight lines L0 and Y3, that is, the rotating speed of the power transmitting member 18 is made higher than the engine speed NE and transmitted to the step-variable transmission portion 20.

In the step-variable transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

When the first clutch C1 and the third brake B3 are engaged, the step-variable transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed NE, with the drive force received from the continuously-variable transmission portion 11, that is, from the power distributing mechanism 16. When the switching clutch B0 is engaged in place of the switching clutch C0, the eighth rotary element RE8 is rotated at a speed higher than the engine speed NE, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
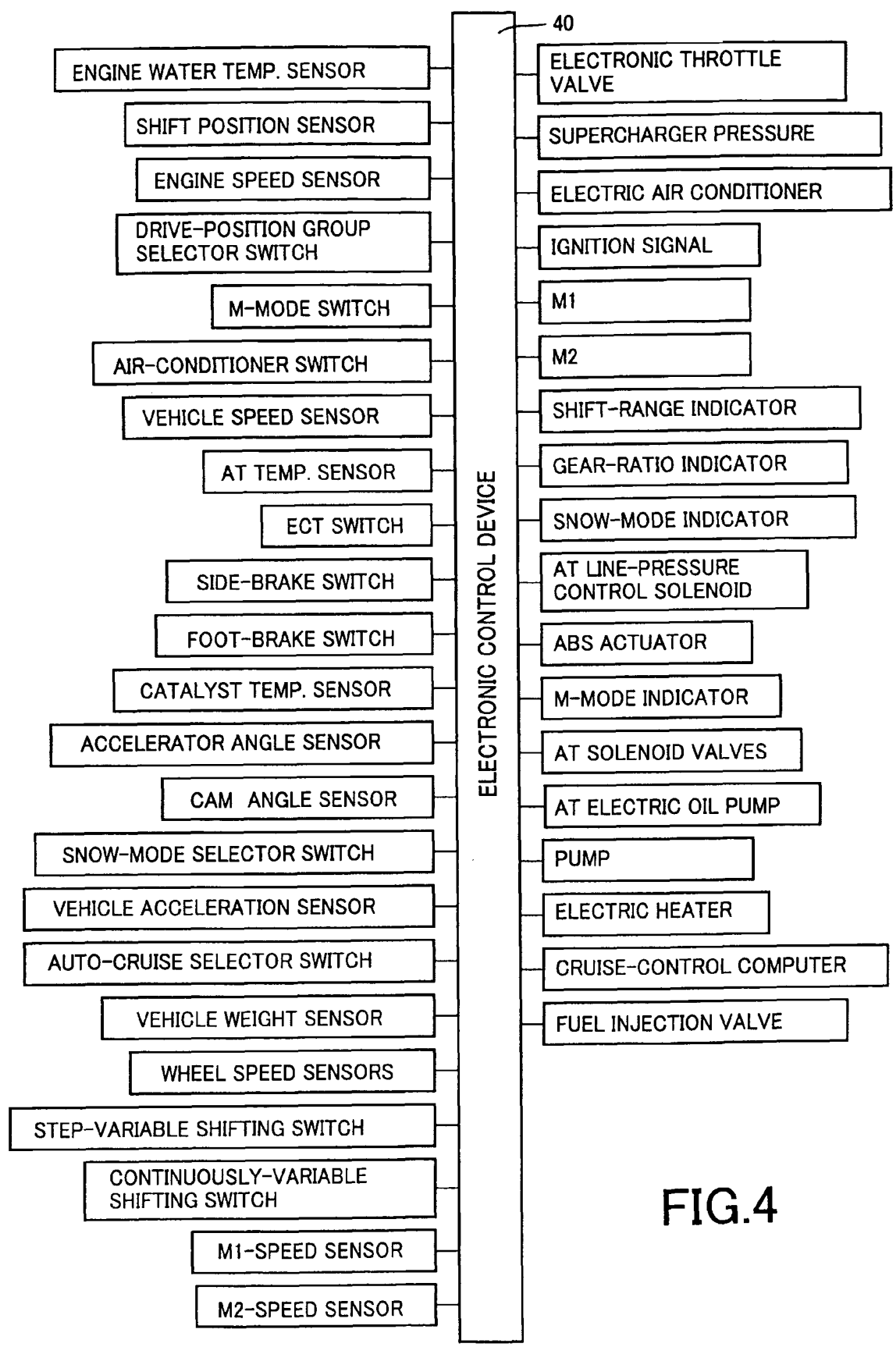
FIG. 4 is a view indicating input and output signals of an electronic control device according to one embodiment of this invention to control the drive system of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the transmission portion 20.

The electronic control device 40 is arranged to receive various sensors and switches shown in FIG. 4, various signals such as: a signal indicative of a temperature TEMPW of cooling water of the engine 8; a signal indicative of a selected operating position PSH of a shift lever; a signal indicative of the operating speed NE of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed V corresponding to the rotating speed NOUT of the output shaft 22; a signal indicative of a temperature of a working oil of the step-variable transmission portion 20; a signal indicative of an operated state of a side brake; a signal indicative of an operated state of a foot brake; a signal indicative of a temperature of a catalyst; a signal indicative of an amount of operation (an angle of operation) ACC of a manually operable vehicle accelerating member in the form of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the continuously-variable transmission portion 11 (power distributing mechanism 16) in the fixed-speed-ratio shifting state in which the transmission mechanism 10 functions as a step-variable transmission; a signal indicative of a continuously-variable shifting switch provided to place the continuously-variable transmission portion 11 in the continuously variable-shifting state (differential state) in which the transmission mechanism 10 functions as the continuously variable transmission; a signal indicative of a rotating speed NM1 of the first electric motor M1 (hereinafter referred to as "first electric motor speed NM1); and a signal indicative of a rotating speed NM2 of the second electric motor M2 (hereinafter referred to as "second electric motor speed NM2).

The electronic control device 40 is further arranged to generate various signals such as: a drive signal to drive a throttle actuator for controlling an angle of opening qTH of an electronic throttle valve 94; a fuel injection amount signal to control an amount of injection of a fuel by a fuel injecting device 96 into the engine 8; a supercharger pressure adjusting signal for adjusting a supercharger pressure of the engine 8; an air conditioner drive signal to operate the electric air conditioner; an ignition signal to be applied to an ignition device 98 to control the ignition timing of the engine 8; signals to operate the electric motors M1 and M2; a signal to operate a shift-range indicator for indicating the selected operating or shift position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; valve drive signals to operate solenoid-operated valves incorporated in a hydraulic control unit 42 (shown in FIG. 5) provided to control the hydraulic actuators of the hydraulically operated frictional coupling devices of the continuously-variable transmission portion 11 and step-variable transmission portion 20; a drive signal to operate an electric oil pump used as a hydraulic pressure source for the hydraulic control unit 42; a signal to drive an electric heater; and a signal to be applied to a cruise-control computer.

FIG. 5 is a functional block diagram of FIG. 5 for explaining major control functions of the control apparatus in the form of the electronic control device 40, which includes a differential-state switching portion 50, a hybrid control portion 52, a shifting control portion 54, a memory 56, a learning control portion 80, a torque-reduction control portion 82, a control-amount calculating portion 84, and a learning abnormality detecting portion 88. The shifting control portion 54 shown in FIG. 5 functions as a step-variable shifting control portion, and is arranged to determine whether a shifting action of the step-variable transmission portion 20 should take place, that is, to determine the gear position to which the step-variable transmission portion 20 should be shifted. This determination is made on the basis of a condition of the vehicle in the form of the vehicle speed V and an output torque TOUT of the step-variable transmission portion 20, and according to a shifting boundary line map (shifting control map or relation) which is stored in the memory 56 and which represents shift-up boundary lines indicated by solid lines in FIG. 5 and shift-down boundary lines indicated by one-dot chain lines in FIG. 5. The shifting control portion 54 generates commands (shifting commands) to be applied to the hydraulic control unit 42, to selectively engage and release the respectively two hydraulically operated frictional coupling devices (except the switching clutch C0 and brake B0), for establishing the determined gear position of the step-variable transmission portion 20 according to the table of FIG. 2.

The hybrid control portion 52 functions as a continuously-variable shifting control portion, and is arranged to control the engine 8 to be operated in an operating range of high efficiency, and control the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio g0 of the continuously-variable transmission portion 11 operating as the electrically controlled continuously variable transmission, while the transmission mechanism 10 is placed in the continuously-variable shifting state, that is, while the continuously-variable transmission portion 11 is placed in the differential state. For instance, the hybrid control portion 52 calculates a target (required) vehicle output at the present running speed V of the vehicle, on the basis of the operating amount ACC of the accelerator pedal used as an operator's required vehicle output and the vehicle running speed V, and calculate a target total vehicle output on the basis of the calculated target vehicle output and a required amount of generation of an electric energy by the first electric motor M1. The hybrid control portion 52 calculates a target output of the engine 8 to obtain the calculated target total vehicle output, while taking account of a power transmission loss, a load acting on various devices of the vehicle, an assisting torque generated by the second electric motor M2, etc. The hybrid control portion 52 controls the speed NE and torque TE of the engine 8, so as to obtain the calculated target engine output, and the amount of generation of the electric energy by the first electric motor M1.

The hybrid control portion 52 is arranged to implement the hybrid control while taking account of the presently selected gear position of the step-variable transmission portion 20, so as to improve the drivability of the vehicle and the fuel economy of the engine 8. In the hybrid control, the continuously-variable transmission portion 11 is controlled to function as the electrically controlled continuously-variable transmission, for optimum coordination of the engine speed NE and vehicle speed V for efficient operation of the engine 8, and the rotating speed of the power transmitting member 18 determined by the selected gear position of the transmission portion 20. That is, the hybrid control portion 52 determines a target value of the overall speed ratio gT of the transmission mechanism 10, so that the engine 8 is operated according to a stored highest-fuel-economy curve (fuel-economy map or relation) stored in memory and indicated by broken line in FIG. 7. The target value of the overall speed ratio gT of the transmission mechanism 10 permits the engine torque TE and speed NE to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed NE and an axis of the engine torque TE. The hybrid control portion 52 controls the speed ratio g0 of the continuously-variable transmission portion 11, so as to obtain the target value of the overall speed ratio gT, so that the overall speed ratio gT can be controlled within a predetermined range, for example, between 13 and 0.5.

In the hybrid control, the hybrid control portion 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2, so that the second electric motor M2 is operated with the supplied electric energy, to produce a mechanical energy to be transmitted to the output shaft 22. Thus, the drive system is provided with an electric path through which an electric energy generated by conversion of a portion of a drive force of the engine 8 is converted into a mechanical energy.

It is noted in particular that the step-variable transmission portion 20 is shifted under the control of the step-variable shifting control portion 54, to change its speed ratio in steps, whereby the overall speed ratio gT of the transmission mechanism 10 is changed in steps. Namely, the overall speed ratio gT of the transmission mechanism 10 is rapidly changed during a shifting action of the step-variable transmission portion 20, in steps or non-continuously, rather than continuously as in a continuously variation transmission the speed ratio of which is continuously changed. The stepping change of the overall speed ratio gT may cause a shifting shock of the transmission mechanism 10, and a failure to control the engine speed NE following the highest-fuel-economy curve, giving rise to a risk of deterioration of the fuel economy of the vehicle.

In view of the facts indicated above, the hybrid control portion 52 is arranged to control the speed ratio of the continuously-variable transmission portion 11 in a direction opposite to the direction of change of the speed ratio g of the step-variable transmission portion 20, in synchronization with a shifting action of the step-variable transmission portion 20, so as to reduce an amount of stepping change of the overall speed ratio gT during the shifting action of the step-variable transmission portion 20. In other words, the hybrid control portion 52 is arranged to control the speed ratio of the continuously-variable transmission portion 11 in synchronization with the shifting action of the step-variable transmission portion 20, so that the overall speed ratio gT continuously changes during the shifting action of the step-variable transmission portion 20. For instance, the hybrid control portion 52 is arranged to change the speed ratio g0 of the continuously-variable transmission portion 11 in the direction opposite to the direction of change of the speed ratio g of the step-variable transmission portion 20, by an amount equal to the amount of stepping change of the speed ratio g, in synchronization with the shifting action of the step-variable transmission portion 20, so as to prevent a non-continuous transient change of the overall speed ratio gT during the shifting action of the step-variable transmission portion 20.

Figure 7:
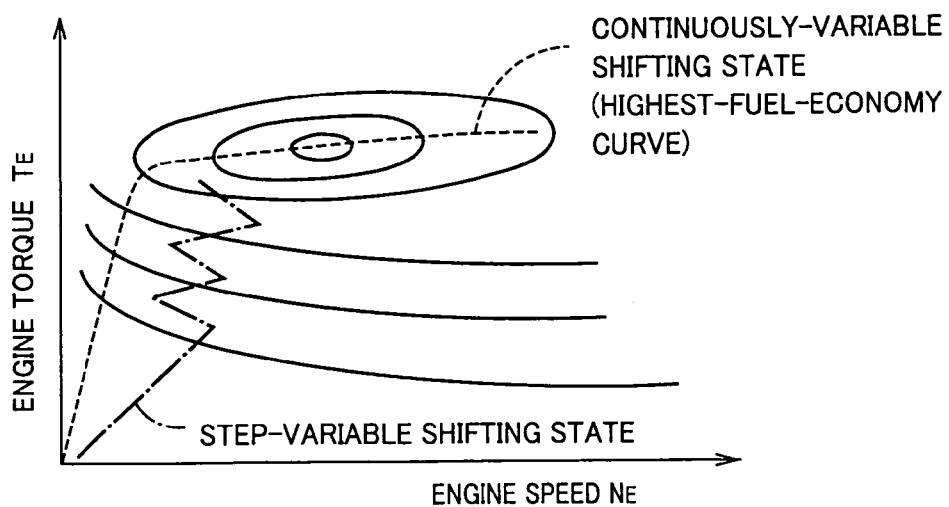
FIG. 7 is a view illustrating an example of a fuel consumption map defining a highest-fuel-economy curve of an engine, and explaining a difference between an operation of the engine in a continuously-variable shifting state (indicated by broken line) of the transmission mechanism and an operation of the engine in a step-variable shifting state (indicated by one-dot chain line) of the transmission mechanism.

Described in another point of view, the engine 8 is generally operated with a step-variable transmission, following a one-dot chain line indicated in FIG. 7, and with a continuously variable transmission, following the highest-fuel-economy curve indicated by broken line in FIG. 7, or following a line closer to the highest-fuel-economy curve, than when the engine 8 is operated with the step-variable transmission. Accordingly, the engine torque TE for obtaining the required vehicle drive torque (drive force) is obtained at the engine speed NE which is closer to the highest-fuel-economy curve, when the engine 8 is operated with the continuously variable transmission than when it is operated with the step-variable transmission. This means that the continuously variable transmission permits a higher degree of fuel economy that the step-variable transmission. Therefore, the hybrid control portion 52 is arranged to control the speed ratio g of the continuously-variable transmission portion 11 such that the engine 8 is operated following the highest-fuel-economy line indicated by the broken line in FIG. 7, for preventing deterioration of the fuel economy, in spite of a stepping change of the speed ratio of the step-variable transmission portion 20 during its shifting action.

As described above, the hybrid control portion 52 is arranged to implement a so-called "synchronous speed ratio control" of the continuously-variable transmission portion 11 in synchronization with the shifting action of the step-variable transmission portion 20. This synchronous speed ratio control is initiated at a moment which is determined by taking account of a response delay from a moment of determination by the step-variable control means 54 of a shifting action of the step-variable transmission portion 20 to a moment of initiation of an actual change of the input speed NIN of the step-variable transmission portion 20 caused by operations of the appropriate hydraulically operated frictional coupling devices, namely, a response delay up to a moment of initiation of a so-called "inertia phase" in which the input speed NIN of the step-variable transmission portion 20, that is, the rotating speed of the power transmitting member 18 changes in the process of the shifting action of the step-variable transmission portion 20. For example, the response delay is obtained by experimentation and stored in memory. Alternatively, the hybrid control portion 52 initiates the synchronous speed ratio control of the continuously-variable transmission portion 11 at a moment of detection of initiation of an actual change of the input speed NIN of the step-variable transmission portion 20. The synchronous speed ratio control of the continuously-variable transmission portion 11 is terminated at a moment of termination of the inertia phase in the process of the shifting action of the step-variable transmission portion 20. For example, a length of duration of the shifting action of the step-variable transmission portion 20 is obtained by experimentation and stored in memory. Alternatively, the hybrid control portion 52 terminates the synchronous speed ratio control of the continuously-variable transmission portion 11 at a moment of detection that the actual change of the input speed NIN of the step-variable transmission portion 20 has been zeroed. Thus, the hybrid control portion 52 implements the synchronous speed ratio control of the continuously-variable transmission portion 11, during the time period of the inertia phase in the process of the shifting action of the step-variable transmission portion 20, for example, during a time period obtained by experimentation, or during a length of time from the moment of initiation of the actual change of the input speed NIN of the step-variable transmission portion 20 to the moment of detection of zeroing of the actual change of the input speed NIN. In other words, the hybrid control portion 52 controls the speed ratio of the continuously-variable transmission portion 11 in the inertia phase of the step-variable transmission portion 20, such that the control of the speed ratio of the continuously-variable transmission portion 11 is effected in synchronization with the shifting action of the step-variable transmission portion 20.

The hybrid control portion 52 includes engine output control means functioning to control the engine 8, so as to provide a required output, by controlling the throttle actuator to open and close the electronic throttle valve 94, and controlling an amount and time of fuel injection by the fuel injecting device 96 into the engine 8, and/or the timing of ignition of the igniter by the ignition device 98, alone or in combination. For instance, the hybrid control portion 52 is basically arranged to control the throttle actuator on the basis of the operating amount ACC of the accelerator pedal and according to a predetermined stored relationship (not shown) between the operating amount ACC and the opening angle qTH of the electronic throttle valve such that the opening angle qTH increases with an increase of the operating amount ACC.

Figure 6:
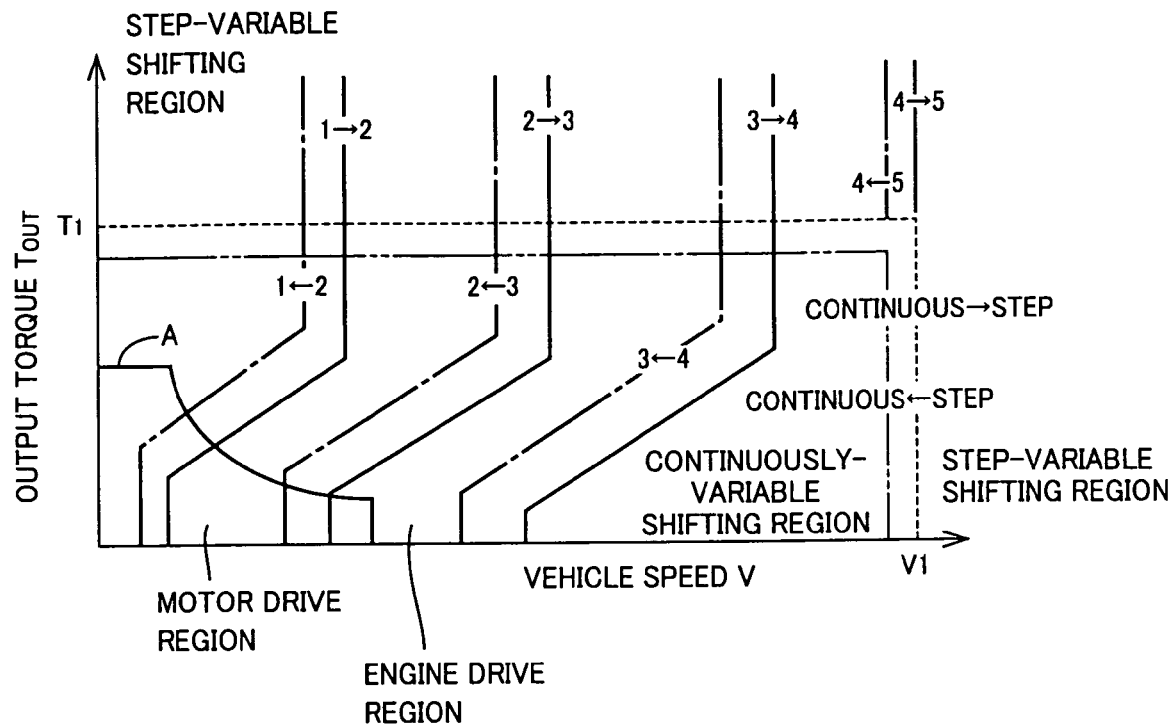
FIG. 6 is a view illustrating an example of a stored shifting boundary line map used for determining a shifting action of a step-variable transmission portion, an example of a stored switching boundary line map used for switching the shifting state of the transmission mechanism, and an example of a stored drive-power-source switching boundary line map defining boundary lines between an engine drive region and a motor drive region for switching between an engine drive mode and a motor drive mode, in the same two-dimensional coordinate system defined by control parameters in the form of a running speed and an output torque of the vehicle, such that those maps are related to each other.

The hybrid control portion 52 is capable of establishing a motor-drive mode to drive the vehicle by the electric motor, by utilizing the electric CVT function of the continuously-variable transmission portion 11, irrespective of whether the engine 8 is in the non-operated state or in the idling state. Solid line A in FIG. 6 represents an example of a boundary line defining an engine-drive region and a motor-drive region, for switching the vehicle drive power source for starting and driving the vehicle (hereinafter referred to as "drive power source"), between the engine 8 and the electric motor (e.g., second electric motor M2). In other words, the vehicle drive mode is switchable between a so-called "engine drive mode" corresponding to the engine-drive region in which the vehicle is started and driven with the engine 8 used as the drive power source, and the so-called "motor-drive mode" corresponding to the motor-drive region in which the vehicle is driven with the second electric motor M2 used as the drive power source. A predetermined stored relationship representing the boundary line (solid line A) of FIG. 6 for switching between the engine-drive mode and the motor-drive mode is an example of a drive-power-source switching map (drive-power-source map) in a two-dimensional coordinate system defined by control parameters in the form of the vehicle speed V and a drive-force-related value in the form of the output torque TOUT. This drive-power-source switching map is stored in the memory 56, together with the shifting boundary line map (shifting map) indicated by solid lines and one-dot chain lines in FIG. 6.

The hybrid control portion 52 determines whether the vehicle condition is in the motor-drive region or engine-drive region, and establishes the motor-drive mode or engine-drive mode. This determination is made on the basis of the vehicle condition represented by the vehicle speed V and the required output torque TOUT, and according to the drive-power-source switching map of FIG. 6. As is understood from FIG. 6, the motor-drive mode is generally established by the hybrid control portion 52, when the output torque TOUT is in a comparatively low range in which the engine efficiency is comparatively low, namely, when the engine torque TE is in a comparatively low range, or when the vehicle speed V is in a comparatively low range, that is, when the vehicle load is comparatively low. Usually, therefore, the vehicle is started in the motor-drive mode, rather than in the engine-drive mode. When the vehicle condition upon starting of the vehicle is outside the motor-drive region defined by the drive-power-source switching map of FIG. 6, as a result of an increase of the required output torque TOUT or engine torque TE due to an operation of the accelerator pedal, the vehicle may be started in the engine-drive mode.

For reducing a dragging of the engine 8 in its non-operated state and improving the fuel economy in the motor-drive mode, the hybrid control portion 52 is arranged to hold the engine speed NE at zero or substantially zero as needed, owing to the electric CVT function (differential function) of the continuously-variable transmission portion 11, that is, by controlling the continuously-variable transmission portion 11 to perform its electric CVT function (differential function), so that the first electric motor speed 1 is controlled so as to be freely rotated to have a negative speed NM1.

The hybrid control portion 52 is further capable of performing a so-called "drive-force assisting" operation (torque assisting operation) to assist the engine 8, by supplying an electric energy from the first electric motor M1 or the electric-energy storage device 60 to the second electric motor M2, so that the second electric motor M2 is operated to transmit a drive torque to the drive wheels 38. Thus, the second electric motor M2 may be used in addition to the engine 8, in the engine-drive mode.

The hybrid control portion 52 is arranged to hold the engine 8 in an operated state owing to the electric CVT function of the continuously-variable transmission portion 11, irrespective of whether the vehicle is stationary or running at a relatively low speed. When the first electric motor M1 is required to be operated to charge the electric-energy storage device 60 while the vehicle is stationary, in order to charge the electric-energy storage device 60 where the electric energy amount SOS stored in the storage device 60 is reduced, the speed NE of the engine 8 which is operated to operate the first electric motor M1 at a relatively high speed can be kept high enough to permit the operation of the engine 8 by itself, owing to the differential function of the power distributing mechanism 16, even while the operating speed of the second electric motor M2 determined by the vehicle speed V is zero (substantially zero) when the vehicle is stationary.

The hybrid control portion 52 is further arranged to control the first electric motor speed NM1 and/or the second electric motor speed NM2, by using the electric CVT function of the continuously-variable transmission portion 11, for thereby holding the engine speed NE constant or changing the engine speed NE to a desired value, irrespective of whether the vehicle is stationary or running. In other words, the hybrid control portion 52 is capable of controlling the first electric motor speed NM1 and/or the second electric motor speed NM2, while holding the engine speed NE constant or changing the engine speed NE to the desired value. When the engine speed NE is raised during running of the vehicle, for example, the hybrid control portion 52 raises the first electric motor speed NM1, while holding substantially constant the second electric motor speed NM2 which is influenced by the vehicle speed V (speed of the drive wheels 38).

The differential-state switching portion 50 is arranged to selectively switch the transmission mechanism 10 between the continuously-variable shifting state and the step-variable shifting state, that is, switch the differential portion 11 between the differential state and the locked state, by engaging and releasing the coupling devices (switching clutch C0 and brake B0) on the basis of the vehicle condition. For example, the differential-state switching portion 50 is arranged to determine whether the shifting state of the transmission mechanism 10 (continuously-variable transmission portion 11) should be changed, on the basis of the vehicle condition represented by the vehicle speed V and the required output torque TOUT and according to the switching boundary line map (switching control map or relation) stored in the memory 56 and indicated by two-dot chain line in FIG. 6 by way of example, namely, whether the vehicle condition is in the continuously-variable shifting region for placing the transmission mechanism 10 in the continuously-variable shifting state, or in the step-variable shifting region for placing the transmission mechanism 10 in the step-variable shifting state.

Described in detail, when the differential-state switching portion 50 determines that the vehicle condition is in the step-variable shifting region, the differential-state switching portion 50 disables the hybrid control portion 52 to implement a hybrid control or continuously-variable shifting control, and enables the step-variable shifting control portion 54 to implement a predetermined step-variable shifting control in which the transmission portion 20 is automatically shifted according to the shifting boundary line map stored in the memory 56 and indicated in FIG. 6 by way of example. FIG. 2 indicates the combinations of the engaging actions of the hydraulically operated frictional coupling devices C0, C1, C2, B0, B1, B2 and B3, which are stored in the memory 56 and which are selectively used for automatic shifting of the step-variable transmission portion 20. In the step-variable shifting state, the transmission mechanism 10 as a whole constituted by the continuously-variable transmission portion 11 and the step-variable transmission portion 20 functions as a so-called step-variable automatic transmission which is automatically shifted according to the table of FIG. 2.

When the high-speed-gear determining means 62 has determined that the transmission mechanism 10 should be shifted to the fifth gear position, the differential-state switching portion 50 commands the hydraulic control unit 42 to release the switching clutch C0 and engage the switching brake B0, for enabling the continuously-variable transmission portion 11 to function as an auxiliary transmission having a fixed speed ratio g0 of 0.7, for example, so that the transmission mechanism 10 as a whole is placed in a high-speed gear position so-called "an overdrive gear position" having a speed ratio lower than 1.0. When the high-speed-gear determining means 62 has not determined that the transmission mechanism 10 should be shifted to the fifth gear position, the differential-state switching portion 50 commands the hydraulic control unit 42 to engage the switching clutch C0 and release the switching brake B0, for enabling the continuously-variable transmission portion 11 to function as an auxiliary transmission having a fixed speed ratio g0 of 1.0, for example, so that the transmission mechanism 10 as a whole is placed in a speed-reducing gear position having a speed ratio not lower than 1.0. Thus, when the transmission mechanism 10 is switched to the step-variable shifting state by the differential-state switching portion 50, the continuously-variable transmission portion 11 operable as the auxiliary transmission is placed in a selected one of two gear positions under the control of the differential-state switching portion 50 while the step-variable transmission portion 20 connected in series to the continuously-variable transmission portion 11 functions as a step-variable transmission, so that the transmission mechanism 10 as a whole functions as the so-called step-variable automatic transmission.

When the differential-state switching portion 50 has determined that the vehicle condition is in the continuously-variable shifting region for placing the transmission mechanism 10 in the continuously-variable shifting state, the differential-state switching portion 50 commands the hydraulic control unit 42 to release both of the switching clutch C0 and brake B0, for placing the continuously-variable transmission portion 11 in the continuously-variable shifting state. At the same time, the differential-state switching portion 50 enables the hybrid control portion 52 to implement the hybrid control, and commands the step-variable shifting control portion 54 to select and hold a predetermined one of the gear positions, or to permit the step-variable transmission portion 20 to be automatically shifted according to the shifting boundary line map stored in the map memory 56 and indicated in FIG. 6 by way of example. In the latter case, the variable-step shifting control portion 54 implements the automatic shifting control by suitably selecting the combinations of the operating states of the frictional coupling devices indicated in the table of FIG. 2, except the combinations including the engagement of the switching clutch C0 and brake B0. Thus, the continuously-variable transmission portion 11 switched to the continuously-variable shifting state under the control of the differential-state switching portion 50 functions as the continuously variable transmission while the step-variable transmission portion 20 connected in series to the continuously-variable transmission portion 11 functions as the step-variable transmission, so that the transmission mechanism 10 provides a sufficient vehicle drive force, such that the input speed NIN of the step-variable transmission portion 20 placed in one of the first through fourth gear positions, namely, the rotating speed N18 of the power transmitting member 18 is continuously changed, so that the speed ratio of the transmission mechanism 10 when the transmission portion 20 is placed in one of those gear positions is continuously variable over a predetermined range. Accordingly, the speed ratio of the step-variable transmission portion 20 is continuously variable across the adjacent gear positions, whereby the total speed ratio gT of the transmission mechanism 10 is continuously variable.

The differential-state switching portion 50 is further configured to determine whether the power distributing mechanism 16 is placed in the differential state, that is, whether the continuously-variable transmission portion 11 is placed in the continuously-variable shifting state, when it is determined that the step-variable transmission portion 20 should perform a shifting action, for example, when the shifting control portion 54 has determined the gear position to which the step-variable transmission portion 20 should be shifted, on the basis of the vehicle condition and according to the shifting boundary line map. For instance, the determination as to whether the continuously-variable transmission portion 11 is placed in the continuously-variable shifting state or not is made by determining whether a point represented by the vehicle condition in the form of the vehicle speed V and the output torque TOUT lies in the continuously-variable shifting region (for placing the transmission mechanism 10 in the continuously-variable shifting state) defined by the switching boundary line map indicated in FIG. 6 by way of example, which switching boundary line map is used by the differential-state switching portion 50 to determine whether the transmission mechanism 10 should be switched to the step-variable or continuously-variable shifting state.

Thus, the differential-state switching portion 50 is configured to determine whether the continuously-variable transmission portion 11 is placed in the differential state, in order to restrict the stepping change of the overall speed ratio gT of the transmission mechanism 10 when it is determined that a shifting action of the step-variable transmission portion 20 should take place in the differential state of the continuously-variable transmission portion 11.

Torque-reduction control portion 82 is arranged to reduce the vehicle drive torque to be transmitted to the drive wheels 38. For instance, the torque-reduction control portion 82 is arranged to implement an engine torque reduction control to reduce the engine torque TE, for thereby reducing the input torque TIN of the step-variable transmission portion 20 to reduce the torque to be transmitted to the drive wheels 38. The engine torque reduction control is implemented by reducing the angle of opening of the electronic throttle valve 94 or the amount of fuel injection by the fuel injecting device 96, or retarding the timing of ignition of the engine 8 by the ignition device 98. The torque-reduction control portion 82 may be arranged to implement an electric-motor torque reduction control in addition to or in place of the engine torque reduction control, for reducing the input torque TIN. The electric-motor torque reduction control is implemented by controlling the inverter 58 to control the second electric motor M2, so as to temporarily generate a reverse vehicle drive torque, or generate a regenerative braking torque while charging the electric-energy storage device 60.

Where a shift-up action of the step-variable transmission portion 20 takes place under the control of the step-variable shifting control portion 54, for example, while the transmission mechanism 10 is placed in the step-variable shifting state by the differential-state switching portion 50 and the transmission mechanism 10 as a whole is functioning as a step-variable automatic transmission, the input speed of the step-variable transmission portion 20, that is, the rotating speed of the power transmitting member 18 changes in the inertia phase of the shift-up action. In this inertial phase, there is a risk of generation of a shifting shock due to a so-called "inertia torque", which is caused by an increase of the input torque TIN or output torque TOUT due to an energy temporarily produced by the engine 8 while its speed NE is lowered.

Where a shifting action of the step-variable transmission portion 20 takes place under the control of the step-variable shifting control portion 54 and the speed ratio of the continuously-variable transmission portion 11 is controlled by the first shifting control means of the hybrid control portion 52 while the transmission mechanism 10 is placed in the continuously-variable shifting state by the differential-state switching portion 50 and the transmission mechanism 10 as a whole is functioning as a continuously variable transmission, the amount of change of the engine speed NE in the process of the shifting action of the continuously-variable transmission portion 11 is zero or restricted. In this case, too, there is a risk of generation of a shifting shock in the inertia phase of the shifting action of the step-variable transmission portion 20 in which the rotating speed of the power transmitting member 18 changes. That is, the shifting shock may take place due to an inertia torque which is caused by an increase of the output torque TOUT as a result of a decrease of the rotating speed of at least one of the fourth rotary element RE4 through the eighth rotary element RE8 of the step-variable transmission portion 20.

There is also a risk of generation of a shifting shock due to an inertia torque in the inertia phase of the shifting action of the step-variable transmission portion 20, which is caused by an increase of the output torque TOUT as a result of a decrease of the second rotary element RE2 or third rotary element RE3 of the continuously-variable transmission portion 11.

In view of the facts described above, the torque-reduction control portion 82 reduces the input torque TIN of the step-variable transmission portion 20 upon a shifting action of the step-variable transmission portion 20 under the control of the step-variable shifting control portion 54. Described in detail, the torque-reduction control portion 82 reduces the input torque TIN of the step-variable transmission portion 20 by an amount corresponding to the inertia torque, by implementing the above-described engine torque reduction control or the electric-motor torque reduction control, or both of these two torque reduction controls, so that the shifting shock is reduced by offsetting the inertial torque with the reduction of the input torque TIN. The reduction of the input torque TIN by the torque-reduction control portion 82 is initiated in the inertial phase of the shifting action of the step-variable transmission portion 20, like the above-described synchronous speed ratio control of the continuously-variable transmission portion 11 by the hybrid control portion 52.

The maps of FIG. 6 will be described in detail. The shifting boundary line map (shifting control map or relation) shown in FIG. 6 by way of example and stored in the memory 56 is used for determining whether the step-variable transmission portion 20 should be shifted, and is defined in a two-dimensional coordinate system by control parameters consisting of the vehicle speed V and the drive-force-related value in the form of the required output torque TOUT. In FIG. 6, the solid lines indicate the shift-up boundary lines, while the one-dot chain lines indicate the shift-down boundary lines.

The broken lines in FIG. 6 represent the upper vehicle-speed limit V1 and the upper output-torque limit T1 which are used for the differential-state switching portion 50 to determine whether the vehicle condition is in the step-variable shifting region or the continuously-variable shifting region. In other words, the broken lines represent a high-speed-running boundary line indicative of the upper vehicle-speed limit V1 above which it is determined that the hybrid vehicle is in a high-speed running state, and a high-output-running boundary line indicative of the upper output-torque limit T1 of the output torque TOUT of the step-variable transmission portion 20 above which it is determined that the hybrid vehicle is in a high-output running state. The output torque TOUT is an example of the drive-force-related value which relates to the drive force of the hybrid vehicle. FIG. 6 also shows two-dot chain lines Which are offset with respect to the broken lines, by a suitable amount of control hysteresis for determination as to whether the step-variable shifting state is changed to the continuously-variable shifting state or vice versa. Thus, the broken lines and two-dot chain lines of FIG. 6 constitute the stored switching boundary line map (switching control map or relation) used by the differential-state switching portion 50 to determine whether the vehicle condition is in the step-variable shifting region or the continuously-variable shifting region, depending upon whether the control parameters in the form of the vehicle speed V and the output torque TOUT are higher than the predetermined upper limit values V, T1. This switching boundary line map may be stored in the memory 56, together with the shifting boundary line map. The switching boundary line map may use at least one of the upper vehicle-speed limit V1 and the upper output-torque limit T1, or at least one of the vehicle speed V and the output torque TOUT, as at least one parameter.

The above-described shifting boundary line map, switching boundary line, and drive-power-source switching map may be replaced by stored equations for comparison of the actual vehicle speed V with the limit value V1 and comparison of the actual output torque TOUT with the limit value T1. In this case, the differential-state switching portion 50 switches the transmission mechanism 10 in the step-variable shifting state by engaging the switching brake B0, when the actual vehicle speed V has exceeded the upper limit V1, or by engaging the switching clutch C0, when the output torque TOUT of the step-variable transmission portion 20 has exceeded the upper limit T1.

The differential-state switching portion 50 may be arranged to place the transmission mechanism 10 in the step-variable shifting state even when the vehicle condition is in the continuously-variable shifting region, upon detection of any functional failure or deterioration of the electric components such as the electric motors which are operable to operate the continuously-variable transmission portion 11 as the electrically controlled continuously variable transmission. Those electric components include components such as the first electric motor M1, second electric motor M2, inverter 58, electric-energy storage device 50 and electric lines interconnecting those components, which are associated with the electric path through which an electric energy generated by the first electric motor M1 is converted into a mechanical energy. The functional deterioration of the components may be caused by their failure or a drop of their temperatures.

The drive-force-related value indicated above is a parameter corresponding to the drive force of the vehicle, which may be the output torque TOUT of the step-variable transmission portion 20, the engine output torque TE or an acceleration value G of the vehicle, as well as a drive torque or drive force of drive wheels 38. The parameter may be: an actual value calculated on the basis of the operating amount ACC of the accelerator pedal 45 or the opening angle of the throttle valve (or intake air quantity, air/fuel ratio or amount of fuel injection) and the engine speed NE;; or any one of estimated values of the required (target) engine torque TE, required (target) output torque TOUT of the transmission potion 20 and required vehicle drive force, which are calculated on the basis of the operating amount ACC of the accelerator pedal 45 or the operating angle of the throttle valve. The above-described vehicle drive torque may be calculated on the basis of not only the output torque TOUT, etc., but also the ratio of the differential gear device 36 and the radius of the drive wheels 38, or may be directly detected by a torque sensor or the like.

For instance, the upper vehicle-speed limit V1 is determined so that the transmission mechanism 10 is placed in the step-variable shifting state while the vehicle is in the high-speed running state. This determination is effective to reduce a possibility of deterioration of the fuel economy of the vehicle if the transmission mechanism 10 were placed in the continuously-variable shifting state while the vehicle is in the high-speed running state. On the other hand, the upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle.

Figure 8:
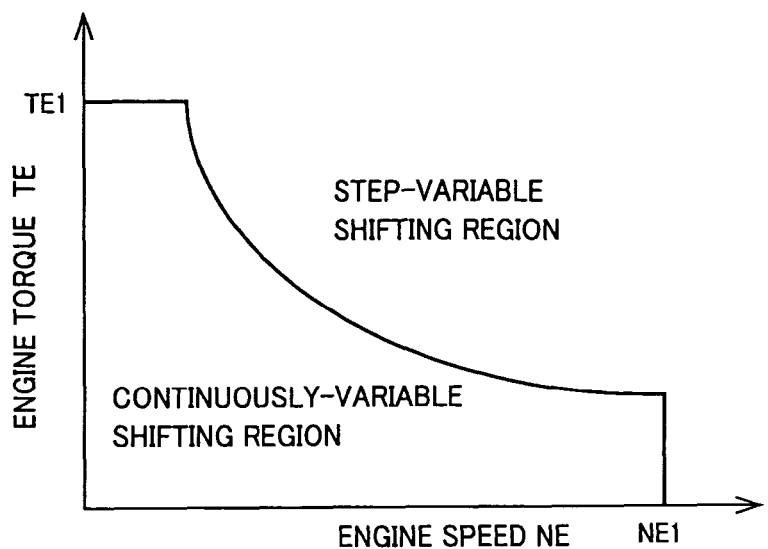
FIG. 8 is a view illustrating a stored relationship defining boundary lines between a continuously-variable shifting region and a step-variable shifting region, which relationship is used to map boundary lines defining the continuously-variable and step-variable shifting regions which are indicated by broken lines in FIG. 6.

Referring to FIG. 8, there is shown a switching boundary line map (switching control map or relation) which is stored in the memory 56 and which defines engine-output lines serving as boundary lines used by the differential-state switching portion 50 to determine whether the vehicle condition is in the step-variable or continuously-variable shifting region. These engine-output lines are defined by control parameters in the form of the engine speed NE and the engine torque NT. The differential-state switching portion 50 may use the switching boundary line map of FIG. 8 in place of the switching boundary line map of FIG. 6, to determine whether the vehicle condition is in the continuously-variable or step-variable shifting region, on the basis of the engine speed NE and engine torque TE. The switching boundary line map of FIG. 6 may be based on the switching boundary line map of FIG. 8. In other words, the broken lines in FIG. 6 may be determined on the basis of the relation (map) of FIG. 8, in the two-dimensional coordinate system defined by the control parameters in the for of the vehicle speed V and the output torque TOUT.

The step-variable shifting region defined by the switching boundary line map of FIG. 6 is defined as a high-torque drive region in which the output torque TOUT is not lower than the predetermined upper limit T1, or a high-speed drive region in which the vehicle speed V is not lower than the predetermined upper limit V1. Accordingly, the step-variable shifting control is implemented when the torque of the engine 8 is comparatively high or when the vehicle speed V is comparatively high, while the continuously-variable shifting control is implemented when the torque of the engine 8 is comparatively low or when the vehicle speed V is comparatively low, that is, when the engine 8 is in a normal output state.

Similarly, the step-variable shifting region defined by the switching boundary line map of FIG. 8 is defined as a high-torque drive region in which the engine torque TE is not lower than the predetermined upper limit TE1, or a high-speed drive region in which the engine speed NE is not lower than the predetermined upper limit NE1, or alternatively defined as a high-output drive region in which the output of the engine 8 calculated on the basis of the engine torque NT and speed NE is not lower than a predetermined limit. Accordingly, the step-variable shifting control is implemented when the torque TE, speed NE or output of the engine 8 is comparatively high, while the continuously-variable shifting control is implemented when the torque TE, speed NE or output of the engine 8 is comparatively low, that is, when the engine 8 is in the normal output state. The boundary lines of the switching boundary switching map of FIG. 8 may be considered as high-speed threshold lines or high-engine-output threshold lines, which define upper limit of the vehicle speed V or engine output.

In the present embodiment described above, the transmission mechanism 10 is placed in the continuously-variable shifting state in a low-speed or medium-speed running state of the vehicle or in a low-output or medium-output running state of the vehicle, assuring a high degree of fuel economy of the vehicle. In a high-speed running of the vehicle at the vehicle speed V higher than the upper limit V1, the transmission mechanism 10 is placed in the step-variable shifting state in which the output of the engine 8 is transmitted to the drive wheels 38 primarily through the mechanical power transmitting path, so that the fuel economy is improved owing to reduction of a loss of conversion of the mechanical energy into the electric energy, which would take place when the continuously-variable transmission portion 11 functions as the electrically controlled continuously variable transmission.

In a high-output running state of the vehicle with the output torque TOUT higher than the upper limit T1, too, the transmission mechanism 10 is placed in the step-variable shifting state. Therefore, the transmission mechanism 10 is placed in the continuously-variable shifting state only when the vehicle speed V is relatively low or medium or when the engine output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first electric motor M1 and the second electric motor M2, and the required size of the drive system including those electric motors.

Namely, the upper limit TE1 is determined such that the first electric motor M1 can withstand the reaction torque when the engine output TE is not higher than the upper limit TE1, and the continuously-variable transmission portion 11 is placed in the step-variable shifting state when the vehicle is in the high-output running state in which the engine torque TE is higher than the upper limit TE1. In the step-variable shifting state of the transmission portion 11, therefore, the first electric motor M1 need not withstand the reaction torque with respect to the engine torque TE as in the continuously-variable shifting state of the transmission portion 11, making it possible to reduce deterioration of durability of the first electric motor M1 while preventing an increase of its required size. In other words, the required maximum output of the first electric motor M1 in the present embodiment can be made smaller than its reaction torque capacity corresponding to the maximum value of the engine output TE. That is, the required maximum output of the first electric motor M1 can be determined such that its reaction torque capacity is smaller than a value corresponding to the engine torque TE exceeding the upper limit TE1, so that the first electric motor M1 can be small-sized.

The maximum output of the first electric motor M1 is a nominal rating of this motor which is determined by experimentation in the environment in which the motor is operated. The above-described upper limit of the engine torque TE is determined by experimentation such that the upper limit is a value which is equal to or lower than the maximum value of the engine torque TE, and below which the first electric motor M1 can withstand the reaction torque, so that the deterioration of durability of the first electric motor M1 can be reduced.

According to the other concept, the transmission mechanism 10 is placed in the step-variable shifting state (fixed-speed-ratio shifting state), rather than in the continuously-variable shifting state, in the high-output running state of the vehicle in which the vehicle operator has a stronger desire for improved drivability of the vehicle rather than improved fuel economy. In this case, the engine speed NE changes with a shift-up action of the step-variable transmission portion 20, assuring a comfortable rhythmic change of the engine speed NE as the transmission portion 20 is shifted up, as indicated in FIG. 9.

Figure 9:
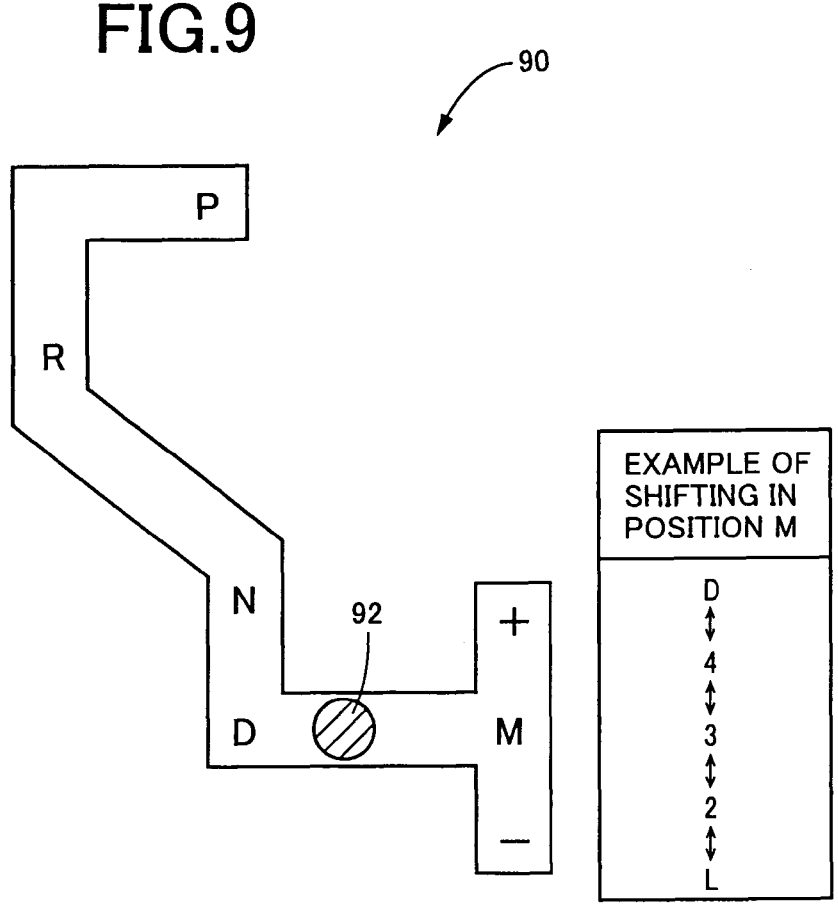
FIG. 9 is a view showing an example of a manually operated shifting device including a shift lever and operable to select one of a plurality of shift positions.

FIG. 9 shows an example of a manually operable shifting device in the form of a shifting device 90. The shifting device 90 includes the shift lever 92, which is disposed laterally adjacent to an operator's seat, for example, and which is manually operated to select one of a plurality of positions consisting of: a parking position P for placing the drive system 10 (namely, step-variable transmission portion 20) in a neutral state in which a power transmitting path is disconnected with both of the switching clutch C0 and brake B0 placed in the released state, and at the same time the output shaft 22 of the step-variable transmission portion 20 is in the locked state; a reverse-drive position R for driving the vehicle in the rearward direction; a neutral position N for placing the drive system 10 in the neutral state; an automatic forward-drive shifting position D; and a manual forward-drive shifting position M.

When the shift lever 92 is operated to a selected one of the shift positions, a manual valve incorporated in the hydraulic control unit 42 and operatively connected to the shift lever 92 is operated to establish the corresponding state of the hydraulic control unit 42. In the automatic forward-drive position D or the manual forward-drive position M, one of the first through fifth gear positions (1st through 5th) indicated in the table of FIG. 2 is established by electrically controlling the appropriate solenoid-operated valves incorporated in the hydraulic control unit 42.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the step-variable transmission portion 20 is in the power-cut-off state established by releasing both of the clutches C1 and C2, as shown in the table of FIG. 2. In the drive positions R, D, M, the power transmitting path in the step-variable transmission portion 20 is in the power-transmitting state established by engaging at least one of the clutches C1 and C2, as also shown in the table of FIG. 2.

Described in detail, a manual operation of the shift lever 92 from the parking position P or neutral position N to the reverse-drive position R causes the second clutch C2 to be engaged for switching the power transmitting path in the step-variable transmission portion 20 from the power-cut-off state to the power-transmitting state. A manual operation of the shift lever 92 from the neutral position N to the automatic forward-drive position D causes at least the first clutch C1 to be engaged for switching the power transmitting path in the step-variable transmission portion 20 from the power-cut-off state to the power-transmitting state. The automatic forward-drive position D provides a highest-speed position, and positions "4" through "L" selectable in the manual forward-drive position M are engine-braking positions in which an engine brake is applied to the vehicle.

The manual forward-drive position M is located at the same position as the automatic forward-drive position D in the longitudinal direction of the vehicle, and is spaced from or adjacent to the automatic forward-drive position D in the lateral direction of the vehicle. The shift lever 92 is operated to the manual forward-drive position M, for manually selecting one of the above-indicated positions "D" through "L". Described in detail, the shift lever 92 is movable from the manual forward-drive position M to a shift-up position "+" and a shift-down position "−", which are spaced from each other in the longitudinal direction of the vehicle. Each time the shift lever 92 is moved to the shift-up position "+" or the shift-down position "−", the presently selected position is changed by one position. The five positions "D" through "L" have respective different lower limits of a range in which the overall speed ratio gT of the transmission mechanism 10 is automatically variable, that is, respective different lowest values of the overall speed ratio gT which corresponds to the highest output speed of the transmission mechanism 10. Namely, the five positions "D" through "L" select respective different numbers of the speed positions (gear positions) of the step-variable transmission portion 20 which are automatically selectable, so that the lowest overall speed ratio gT available is determined by the selected number of the gear positions. The shift lever 92 is biased by biasing means such as a spring so that the shift lever 92 is automatically returned from the shift-up position "+" and shift-down position "−" back to the manual forward-drive position M. The shifting device 46 is provided with a shift-position sensor (not shown) operable to detect the presently selected position of the shift lever 92, so that signals indicative of the presently selected operating position of the shift lever 48 and the number of shifting operations of the shift lever 92 in the manual forward-shifting position M are applied to the electronic control device 40.

When the shift lever 92 is operated to the automatic forward-drive position D, the differential-state switching portion 50 effects an automatic switching control of the transmission mechanism 10 according to the stored switching boundary line map indicated in FIG. 6, and the hybrid control portion 52 effects the continuously-variable shifting control of the power distributing mechanism 16, while the step-variable shifting control portion 54 effects an automatic shifting control of the step-variable transmission portion 20. When the transmission mechanism 10 is placed in the step-variable shifting state, for example, the shifting action of the transmission mechanism 10 is automatically controlled to select an appropriate one of the first through the fifth gear position indicated in FIG. 2. When the drive system is placed in the continuously-variable shifting state, the speed ratio of the power distributing mechanism 16 is continuously changed, while the shifting action of the step-variable transmission portion 20 is automatically controlled to select an appropriate one of the first through fourth gear positions, so that the overall speed ratio gT of the transmission mechanism 10 is controlled so as to be continuously variable within the predetermined range. The automatic forward-drive position D is a position selected to establish an automatic shifting mode (automatic mode) in which the transmission mechanism 10 is automatically shifted.

When the shift lever 92 is operated to the manual forward-drive position M, on the other hand, the shifting action of the transmission mechanism 10 is automatically controlled by the differential-state switching portion 50, hybrid control portion 52 and step-variable shifting control portion 54, such that the overall speed ratio gT is variable within a predetermined range the lower limit of which is determined by the gear position having the lowest speed ratio, which gear position is determined by the manually selected one of the shift positions. When the transmission mechanism 10 is placed in the step-variable shifting state, for example, the shifting action of the transmission mechanism 10 is automatically controlled within the above-indicated predetermined range of the overall speed ratio gT. When the transmission mechanism 10 is placed in the step-variable shifting state, the speed ratio of the power distributing mechanism 16 is continuously changed, while the shifting action of the step-variable transmission portion 20 is automatically controlled to select an appropriate one of the gear positions the number of which is determined by the manually selected one of the shift positions, so that the overall speed ratio gT of the transmission mechanism 10 is controlled so as to be continuously variable within the predetermined range. The manual forward-drive position M is a position selected to establish a manual shifting mode (manual mode) in which the selectable gear positions of the transmission mechanism 10 are manually selected.

Referring back to the functional block diagram of FIG. 5, the learning control portion 80 indicated above is configured to implement learning compensation of control amounts of control elements to be controlled during a shifting action of the step-variable transmission portion 20, so as to prevent or reduce a risk of generation of a shifting shock of the step-variable transmission portion 20. That is, the shifting shock would be generated due to variations of the step-variable transmission portion 20 with respect to nominal specifications, for example, if the control amounts are controlled in a predetermined fixed manner.

Described more specifically, the learning control portion 80 is arranged to learn the control amount in the form of the engaging pressure of each of at least one of the clutches C1, C2 and brakes B1, B2 and B3 of the step-variable transmission portion 30, which is associated with a shifting action of the step-variable transmission portion 20 and which is at least one control element in the form of the frictional coupling device to be controlled during the shifting action. The engaging pressure of each frictional coupling device associated with the shifting action is learned on the basis of the input shaft speed NIN of the step-variable transmission portion 20. The term "engaging pressure" of the frictional coupling device is broadly interpreted to mean not only the engaging pressure, but also a length of time during which the engaging pressure is held constant or changed, and a rate of change of the engaging pressure. It is also noted that the learning of the engaging pressure of each relevant frictional coupling device may be made on the basis of the input torque TIN of the step-variable transmission portion 20, the output torque TM2 of the second electric motor M2, the reaction torque TM1 of the first electric motor M1, or any other suitable parameter other than the input shaft speed NIN of the step-variable transmission portion 20. Further, the learning may be made on the basis of a combination of the parameters NIN, TIN, TM2, TM1, etc. The method of the learning is selected from methods widely and generally known in the art.

The learning of the engaging pressure of each relevant frictional coupling device is made in two different manners depending upon the respective continuously-variable shifting state (differential state) and the step-variable shifting state (non-differential state) of the continuously-variable transmission portion 11. That is, the learning control portion 80 includes a differential-state learning control portion 80D operable when the continuously-variable transmission portion 11 is placed in the continuously-variable shifting state, and a non-differential-state learning control portion 80N operable when the continuously-variable transmission portion 11 is placed in the step-variable shifting state. Each of the differential-state and non-differential-state learning control portions 80D, 80N is configured to effect the learning of the engaging pressure of each relevant frictional coupling device for each of the different shifting actions of the step-variable transmission portion 20, that is, for each of the shift-up action from the first gear position to the second gear position, the shift-up action from the second gear position to the third gear position, the shift-down action from the second gear position to the first gear position, the shift-down action from the third gear position to the second gear position, etc.

The learning control portion 80 further includes a learning-sufficiency detecting portion 80C which is configured to detect sufficiency or insufficiency of the learning of the engaging pressure of each relevant frictional coupling device by the differential-state learning control portion 80D and the non-differential-state learning control portion 80N. For example, the learning-sufficiency detecting portion 80C is configured to determine that the learning which has been effected is sufficient, if the number of learning cycles which have been performed has exceeded a predetermined threshold value. In this respect, it is noted that the learning has not been effected by the differential-state and non-differential-state learning control portions 80D, 80N, upon shipment of the vehicle from a manufacturer or supplier of the vehicle. Generally, a vehicle runs more frequently at a relatively small amount of operation ACC of the accelerator pedal or at a relatively low speed, than at a relatively large amount of operation ACC of the accelerator pedal or at a relatively high speed. In this running condition of the vehicle, the continuously-variable transmission portion 11 is placed in the continuously-variable shifting state. Accordingly, the learning by the differential-state learning control portion 80D tends to be effected before the learning by the non-differential-state learning control portion 80N.

The learning control portion 80 may be configured to reset the result of the already effected learning, that is, to reset the learned value to an initial value, when a learning abnormality detecting portion 88 (which will be described) has detected an abnormality relating to the result of learning effected by the learning control portion 80.

The control-amount calculating portion 84 is configured to calculate a control amount corresponding to the non-selected one of the continuously-variable and step-variable shifting states (differential and non-differential states) of the continuously-variable transmission portion 11, on the basis of a learning compensation amount corresponding to the presently selected shifting state of the continuously-variable transmission portion 11. Described in detail, when the continuously-variable transmission portion 11 is placed in the step-variable shifting state, the control-amount calculating portion 84 calculates a compensation amount of the control amount during a shifting action of the step-variable transmission portion 20, on the basis of a learning compensation amount obtained from the result of learning by the differential-state learning control portion 80D. When the transmission portion 11 is placed in the continuously-variable shifting state, the control-amount calculating portion 84 calculates a compensation amount of the control amount during the shifting action of the step-variable transmission portion 20, on the basis of a learning compensation amount obtained from the result of learning by the non-differential-state learning control portion 80N.

The operation of the control-amount calculating portion 84 will be described in a specific example of the running condition of the vehicle. In this example, the differential-state switching portion 50 determines that the step-variable transmission portion 20 should be shifted up from the first gear position to the second gear position in the step-variable shifting state of the continuously-variable shifting state of the continuously-variable transmission portion 11. This shift-up action of the step-variable transmission portion 20 is achieved by releasing action of the frictional coupling device in the form of the brake B3 and the concurrent engaging action of the frictional coupling device in the form of the brake B2. If the learning-sufficiency detecting portion 80C has detected that the sufficient learning of the control amounts in the form of the engaging pressures of the brake B3 and B2 has been effected by the non-differential-state learning control portion 80N in the step-variable shifting state of the continuously-variable transmission portion 11, the engaging pressure of the brake B3 to be released and the engaging pressure of the brake B2 to be engaged are controlled according to the control amounts compensated on the basis of the result of learning by the learning control portion 80. If the learning-sufficiency detecting portion 80C has not determined that the sufficient learning of the engaging pressures of the brakes B3, B2 has been effected by the non-differential-state learning control portion 80N, the control-amount calculating portion 84 calculates the engaging pressures of the brakes B3, B2 that are to be established during their releasing and engaging actions.

In this case, the control-amount calculating portion 84 refers to a tendency of the result of learning by the differential-state learning control portion 80D in the differential state (continuously-variable shifting state) of the continuously-variable transmission portion 11 which is different from the presently selected non-differential state (step-variable shifting state) of the transmission portion 11. The tendency of the result of learning means at least one of the direction and rate of compensation (change) of the control amounts, more specifically, at least one of: an increase or decrease of the compensation amount of the engaging pressure of each of the brakes B3, B2; lengths of time during which the releasing and engaging actions of the brakes B3, B2 take place; a point of time at which a substantial portion of the torque begins to be transmitted through the brake B2 in the process of the engaging action, rather than the brake B3 in the process of the releasing action. On the basis of the tendency of the result of learning in the differential state of the continuously-variable transmission portion 11, the control-amount calculating portion 84 calculates the control amounts of the engaging pressures of the brakes B3, B2 in the non-differential state of the continuously-variable transmission portion 11, according to a predetermined method of calculation. Where the result of learning of the engaging pressure of the brake B2 in the differential state reveals an increase of the compensation amount of the engaging pressure, the control-amount calculating portion 84 calculates a compensation amount of 20% increase of the engaging pressure in the non-differential state, so that the engaging pressure of the brake B2 is increased by 20%.

The control-amount calculating portion 84 uses the tendency of the result of learning by the differential-state learning control portion 80D, rather than the result of learning per se in the above-indicated example, for the reason described below. That is, the transmission mechanism 10 has two different inertia phases depending upon whether the continuously-variable transmission portion 11 is placed in the continuously-variable shifting state or the step-variable shifting state. Accordingly, the step-variable transmission portion 20 has different input torque values in the continuously-variable and step-variable shifting state of the differential portion 11, so that a shifting action of the step-variable transmission portion 20 takes place in different conditions in the two different shifting states of the differential portion 11, even if the value of the parameter (input shaft speed NIN of the step-variable transmission portion 20) used for the learning by the learning control portion 80 is the same in the two different shifting states of the differential portion 11.

The learning control portion 80 inhibits the calculation of the control amounts by the control-amount calculating portion 84, or inhibits the compensation of the control amounts by more than a predetermined limit, which calculation or compensation is based on the result of learning by the learning control portions 80D, 80N, when the learning abnormality detecting portion 88 has detected an abnormality relating to the result of learning by the learning control portion 80. That is, the learning control portion 80 is configured to inhibit or restrict an operation of the control-amount calculating portion 84 when the abnormality is detected by the learning abnormality detecting portion 88.

The learning abnormality detecting portion 88 is configured to determine that one of the results of learning by the differential-state and non-differential-state learning control portions 80D, 80N is abnormal, if there exists a large amount of difference between the two results of learning, which takes place, for example, when the tendencies of the results of learning by the learning control portions 80D, 80N has a large amount of difference due to generation of a racing phenomenon in the continuously-variable shifting state of the transmission portion 11 and a tie-up phenomenon in the step-variable shifting state, even at the same value of the parameter used for the learning by the two learning control portions 80D, 80N.

Figure 10:
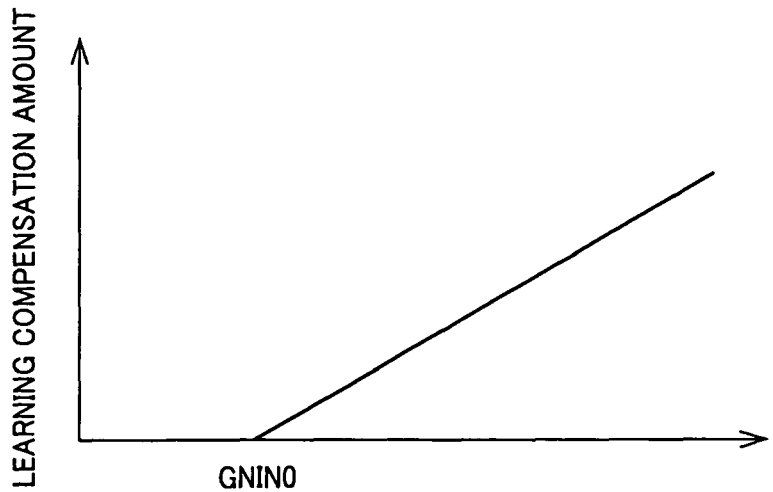
FIG. 10 is a graph indicating an example of a relationship between a learning compensation amount and a racing amount of an input shaft speed NIN of the step-variable transmission portion.
Figure 11:
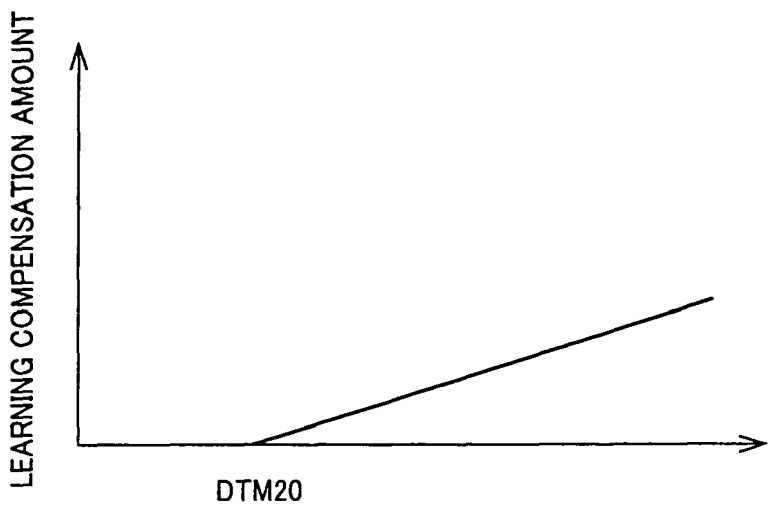
FIG. 11 is a graph indicating an example of a relationship between the learning compensation amount and a torque reduction amount DTM2 of a second electric motor.
Figure 12:
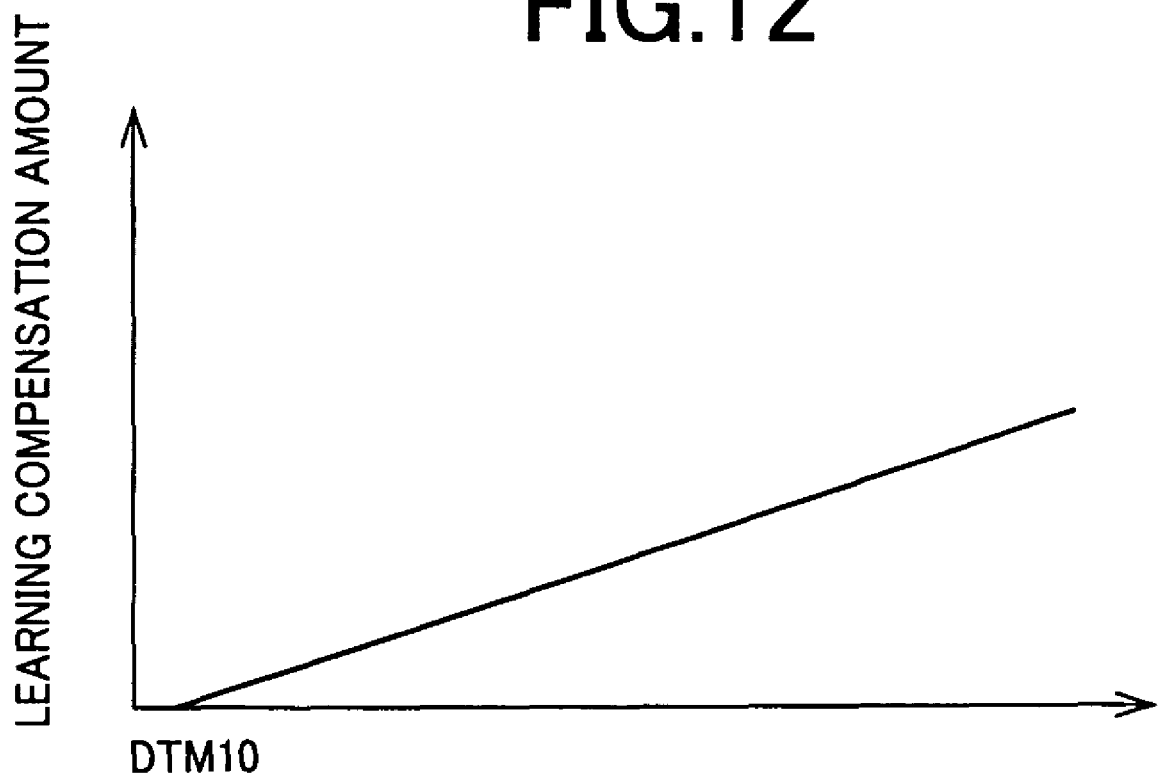
FIG. 12 is a graph indicating an example of a relationship between the learning compensation amount and a reaction torque reduction amount DTM1 of a first electric motor.

The graphs of FIGS. 10-12 indicate examples of the result of learning by the differential-state learning control portion D, when the step-variable transmission portion 20 is shifted up from the first gear position to the second gear position in the continuously-variable shifting state of the continuously-variable transmission portion 11, as in the example described above. The graph of FIG. 10 indicates the result of learning in relation to a racing amount GNIN of the input shaft speed NIN of the step-variable transmission portion 20, that is, a relationship between the compensation amount of the control amount and the racing amount GNIN. As indicated in FIG. 10, the control amount is not compensated, that is, the learning compensation amount of the control amount is held zero until the racing amount GNIN exceeds a predetermined value GNIN0. However, the compensation amount increases as the racing amount GNIN increases from the predetermined value GNIN0. Namely, the engaging pressures of the frictional coupling devices in the form of the brakes B3 and B2 released and engaged to shift up the step-variable transmission portion 20 from the first gear position to the second gear position are compensated to speed up the shift-up action, in other words, to cause a tendency toward a tie-up phenomenon of the transmission portion 20. The transmission portion 20 tends to have the tie-up phenomenon when the engaging pressure of the brake B3 in the process of the releasing action is rapidly reduced, or when the engaging pressure of the brake B2 in the process of the engaging action is rapidly increased, or when the engaging pressures of the brakes B3, B2 are respectively rapidly reduced and increased concurrently.

FIG. 11 indicates the result of learning in relation to a reduction amount DTM2 of the output torque TM2 of the second electric motor M2, that is, a relationship between the compensation amount of the control amount and the torque reduction amount DTM2. The input torque TIN of the step-variable transmission portion 20 is reduced under the control of the torque-reduction control portion 82 when the racing amount GNIN of the input shaft speed NIN of the transmission portion 20 has exceeded a predetermined value. The input torque TIN can be reduced by reducing the output torque TM2 of the second electric motor M2. The reduction of the input torque TIN by the torque-reduction control portion 82 is continued until the racing phenomenon of the input shaft speed NIN is eliminated, that is, until the racing amount GNIN is zeroed. Accordingly, a duration of reduction of the input torque TIN increases with a duration of the racing phenomenon, so that the torque reduction amount DTM2 is a product of the reduction amount of the output torque TM2 and the reduction time of the input torque NIN. Namely, the torque reduction amount DTM2 is equal to (TM2−TM2')×t, wherein TM2'(N·m) and TM2(N·m) respectively represent the output torque values of the second electric motor M2 after and before the torque reduction, while t (sec) represents the reduction time of the input torque TIN. As indicated in FIG. 11, the control amount is not compensated, that is, the learning compensation amount of the control amount is held zero until the torque reduction amount DTM2 exceeds a predetermined value DTM20. However, the compensation amount increases as the torque reduction amount DTM2 increases from the predetermined value DTM20. Namely, the engaging pressures of the frictional coupling devices in the form of the brakes B3 and B2 released and engaged to shift up the step-variable transmission portion 20 from the first gear position to the second gear position are compensated to speed up the shift-up action, in other words, to cause the tendency toward the tie-up phenomenon of the transmission portion 20. As indicated above, The transmission portion 20 tends to have the tie-up phenomenon when the engaging pressure of the brake B3 in the releasing action is rapidly reduced, or when the engaging pressure of the brake B2 in the engaging action is rapidly increased, or when the engaging pressures of the brakes B3, B2 are respectively rapidly reduced and increased concurrently.

FIG. 12 indicates the result of learning in relation to a reduction amount DTM1 of the reaction torque TM1 of the first electric motor M1, that is, a relationship between the compensation amount of the control amount and the reaction torque reduction amount DTM1. The input torque TIN of the step-variable transmission portion 20 is reduced under the control of the torque-reduction control portion 82 when the racing amount GNIN of the input shaft speed NIN of the transmission portion 20 has exceeded the predetermined value. The input torque TIN can be reduced by reducing the reaction torque TM1 of the first electric motor M1, since the input torque TIN includes the reaction torque TM1. The reduction of the input torque TIN by the torque-reduction control portion 82 is continued until the racing phenomenon of the input shaft speed NIN is eliminated, that is, until the racing amount GNIN is zeroed. Accordingly, the duration of reduction of the input torque TIN increases with the duration of the racing phenomenon, so that the reaction torque reduction amount DTM1 is a product of the reduction amount of the reaction torque TM1 and the reduction time of the input torque NIN. Namely, the reaction torque reduction amount DTM2 is equal to (TM1'−TM1)×t, wherein TM1'(N·m) and TM1(N·m) respectively represent the output torque values of the first electric motor M1 after and before the reaction torque reduction, while t (sec) represents the reduction time of the input torque TIN. As indicated in FIG. 12, the control amount is not compensated, that is, the learning compensation amount of the control amount is held zero until the reaction torque reduction amount DTM1 exceeds a predetermined value DTM10. However, the compensation amount increases as the reaction torque reduction amount DTM1 increases from the predetermined value DTM10. Namely, the engaging pressures of the frictional coupling devices in the form of the brakes B3 and B2 released and engaged to shift up the step-variable transmission portion 20 from the first gear position to the second gear position are compensated to speed up the shift-up action, in other words, to cause the tendency toward the tie-up phenomenon of the transmission portion 20. As indicated above, The transmission portion 20 tends to have the tie-up phenomenon when the engaging pressure of the brake B3 in the releasing action is rapidly reduced, or when the engaging pressure of the brake B2 in the engaging action is rapidly increased, or when the engaging pressures of the brakes B3, B2 are respectively rapidly reduced and increased concurrently.

Figure 13:
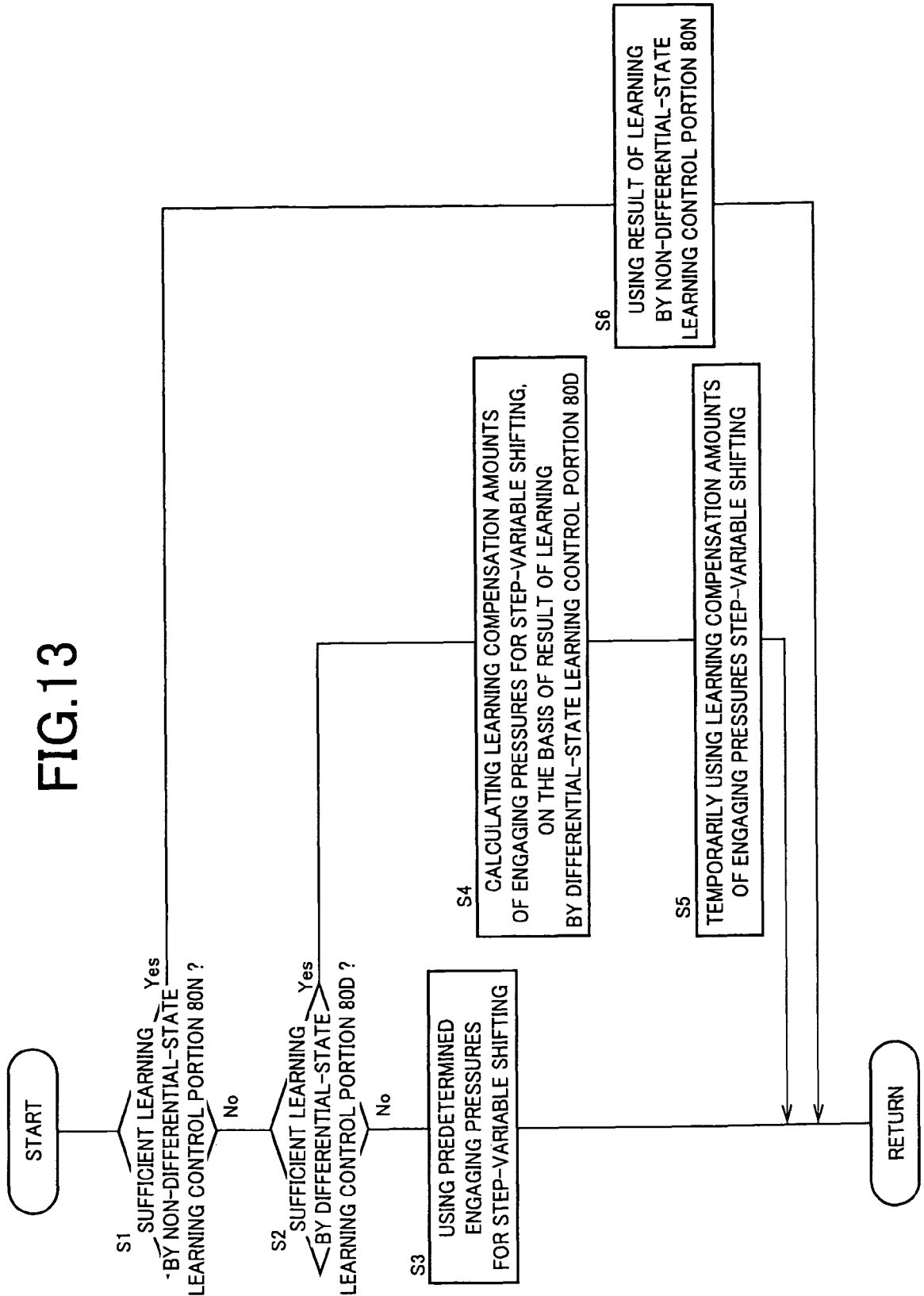
FIG. 13 is a flow chart illustrating a control operation of the electronic control device of FIG. 5, that is.

Referring to the flow chart of FIG. 13, there is illustrated a major control function of the electronic control device 40, that is, a control routine to determine the learning compensation amount of the control amounts in the form of the engaging pressures of the brake B3 and B2 which are respectively released and engaged to shift up the step-variable transmission portion 20 from the first gear position to the second gear position. This control routine is repeatedly executed with an extremely short cycle time of about several milliseconds to several tends of milliseconds.

The control routine is initiated with step S1 corresponding to the learning-sufficient detecting portion 80C, to determine whether the learning which has been effected by the nondifferential-state learning control portion 80N corresponding to the presently selected step-variable shifting state of the transmission mechanism 10 is sufficient. If an affirmative determination is obtained in step S1, the control flow goes to step S6. If a negative determination is obtained in S1, the control flow goes to step S2 also corresponding to the learning-sufficiency detecting portion 80C.

Step S2 is provided to determine whether the learning which has been effected by the differential-state learning control portion 80D corresponding to the continuously-variable shifting state of the transmission mechanism 10 which is not presently selected is sufficient. If an affirmative determination is obtained in step S2, the control flow goes to step S4. If a negative determination is obtained in step S2, the control flow goes to step S3.

Thus, step S3 is implemented when the learning by the non-differential-state learning control portion 80N corresponding to the presently selected state of the transmission portion 10 and the learning by the differential-state learning control portion 80D corresponding to the state different from the presently selected state of the transmission portion 10 are both insufficient. that is, when the results of learning by the non-differential-state and differential-state learning control portions 80N, 80D cannot be used for controlling the engaging pressures of the brakes B3, B2 to perform the shift-up action of the step-variable transmission portion 20. Accordingly, the engaging pressures are controlled according to predetermined control amounts obtained by experimentation, for instance, control amounts stored in the shifting control portion 54.

Step S4 corresponding to the control-amount calculating portion 84 is implemented when the learning by the non-differential-state learning control portion 80N corresponding to the presently selected state of the transmission mechanism 10 is insufficient while the learning by the differential-state learning control portion 90D corresponding to the state different from the presently selected state is sufficient, the compensation amounts of the engaging pressures are calculated on the basis of the result of learning by the differential-state learning control portion 80D.

Step S4 is followed by step S5 in which the compensation amounts calculated in step S4 are temporarily used to control the engaging pressures. Namely, the compensation amounts presently calculated in step S4 are used in step S5. After the learning by the non-differential-state learning control portion 80N is determined in step S2 to be sufficient, however, the result of learning of the engaging pressures by the non-differential-state learning control portion 90N is used in step S6, as described below.

Step S6 is implemented when the learning by the non-differential-state learning control portion 80N corresponding to the presently selected state of the transmission portion 10 is determined in step S1 to be sufficient. In this step s6, the engaging pressures are compensated on the basis of the result of learning by the non-differential-state learning control portion 80N.

Figure 14:
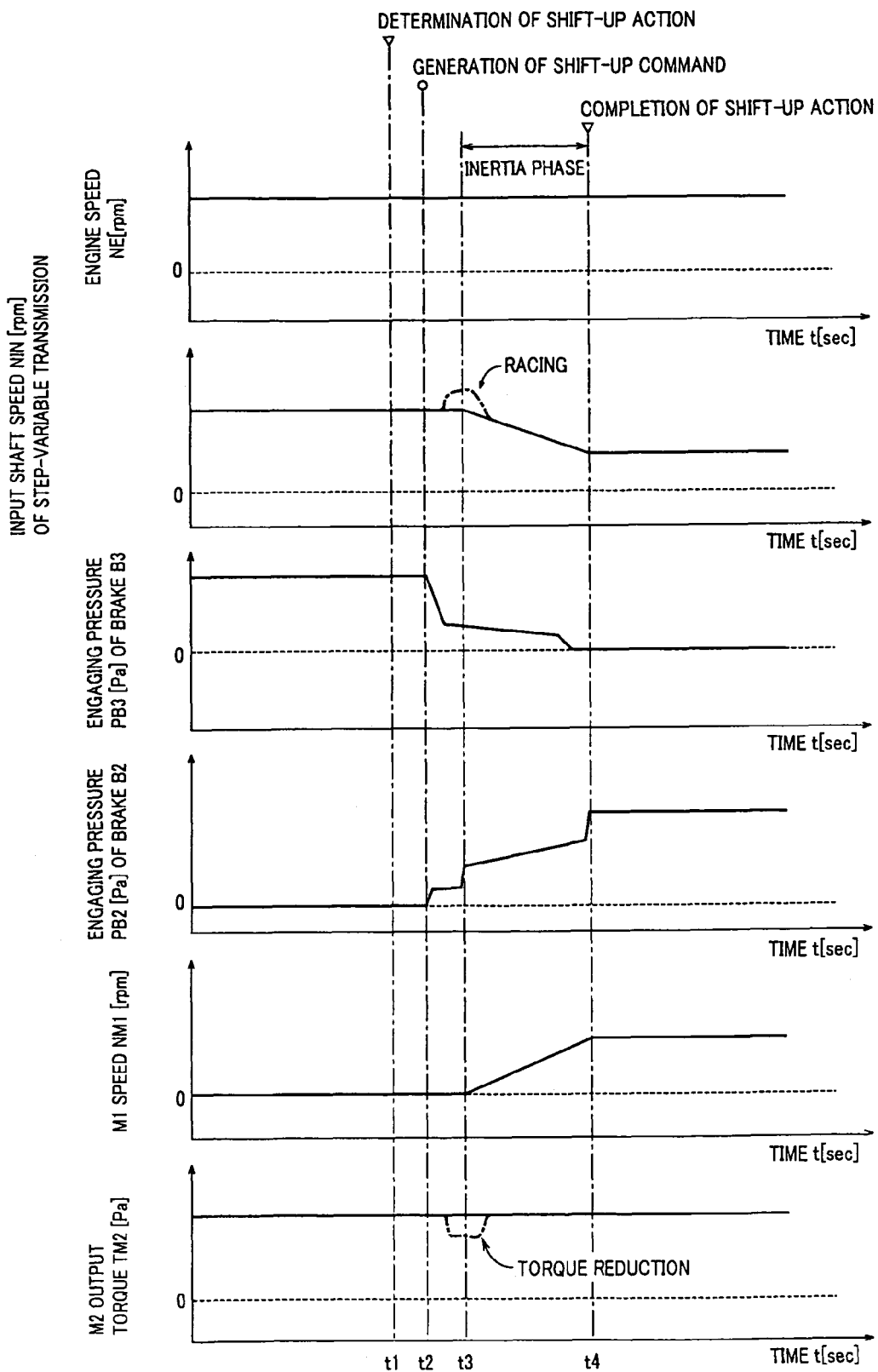
FIG. 14 is a time chart indicating changes of various parameters of the transmission mechanism upon a shifting action of the step-variable transmission portion from a first gear position to a second gear position in the step-variable shifting state of the transmission mechanism.

Referring to the time chart of FIG. 14, there are indicated changes of various parameters of the transmission mechanism 10 during learning by the learning control portion 80, more specifically, changes of the engine speed NE, input shaft speed NIN of the step-variable transmission portion 20, engaging pressure PB2 of the brake B3, engaging pressure PB2 of the brake B2, speed NM1 of the first electric motor M1 and output torque TM2 of the second electric motor M2, when the step-variable transmission portion 20 is shifted up from the first gear position to the second gear position in the step-variable shifting state of the transmission mechanism 10.

At a point of time t1 indicated in FIG. 14, the differential-state switching portion 50 has determined that the step-variable transmission portion 20 should be shifted up from the first gear position to the second gear position in the step-variable shifting state of the transmission mechanism 10. According to this determination, the shifting control portion 54 commands the hydraulic control unit 42 to reduce the engaging pressure of the brake B3 to be released, and concurrently increase the engaging pressure of the brake B2. Thus, the shift-up action is a so-called "clutch-to-clutch" shifting action by which is effected by concurrent releasing and engaging actions of the respective brakes B3, B2.

In the process of the shift-up action of the step-variable transmission portion 20, the input shaft speed NIN of the step-variable transmission portion 20 begins to be reduced, and the so-called "inertia phase" is initiated, as indicated by solid lines in FIG. 14. The input shaft speed NIN and a rate of change of this input shaft speed NIN can be detected by a resolver provided on the second electric motor M2. If the shift-up action progresses normally, there does not arise a racing phenomenon of the input shaft speed NIN.

If the step-variable transmission portion 20 have variations with respect to the nominal specifications, the shift-up action of the step-variable transmission 20 will not progress normally if the engaging pressures of the brakes B3, B2 are controlled according to the predetermined control amounts and timings. For instance, the variations may cause an excessively long interval between a moment of substantial releasing of the brake B3 and a moment of substantially engagement of the brake B2, which causes a racing of the input shaft speed NIN at a point of time t3, as indicated by broken lines in FIG. 14. If the input shaft speed NIN exceeds a predetermined upper limit of 200 r.p.m., for example, the torque-reduction control portion 82 implements the reduction of the input torque TIN of the step-variable transmission portion 20, until the racing phenomenon of the input shaft speed NIN is eliminated. This reduction of the input torque TIN is implemented by reducing the output torque TM2 of the second electric motor M2. The reduction of the output torque TM2 of the second electric motor M2 is indicated by one-dot chain line in FIG. 14. Although only the reduction of the output torque TM2 of the second electric motor M2 is indicated in FIG. 14, the input torque TIN may be reduced under the torque-reduction control means 82, by reducing the reaction torque TM1 of the first electric motor M1, in addition to or in place of the reduction of the output torque TM2, or by reducing the output torque TE of the engine 8. As a result of the operation of the torque-reduction control portion 82, the brake B2 begins to have a torque capacity, and the shift-up action takes place as indicated by solid lines in FIG. 14.

In the event indicated above, the differential-state learning control portion 80D implements the learning of the engaging pressures of the brakes B3, B2, and the releasing timing of the brake B3 and the engaging timing of the brake B2, on the basis of the output torque TM2 of the second electric motor M2, or other suitable parameter.

In the control apparatus constructed according to the present embodiment described above, the learning control portion 80 includes the differential-state learning control portion 80D operable to implement the learning compensation of the control amount of the control element when the shifting action of the step-variable transmission portion 20 takes place in the differential state of the continuously-variable transmission portion 11, and the non-differential-state learning control portion 80N operable to implement the learning compensation of the control amount when the shifting action takes place in the non-differential state of the continuously-variable transmission portion 11, and the shifting control portion 54 controls the shifting action of the step-variable transmission portion 20 in a presently selected one of the differential and non-differential states of the continuously-variable transmission portion 11, on the basis of the learning compensation which has been implemented by one of the differential-state and non-differential-state learning control portions 80D, 80N which is operable in the other of the differential and non-differential states of the continuously-variable transmission portion 11. Accordingly, the control amount of the control element to be controlled during the shifting action of the transmission portion is controlled adequately on the basis of the learning compensation which has been implemented by the differential-state or non-differential state learning control portion 80D, 80N which is operable in the state of the electrically controlled differential portion which is different from the presently selected state in which the shifting action of the transmission portion takes place. Thus, the control amount is controlled so as to prevent or reduce the risk of generation of a shifting shock of the transmission portion.

The present embodiment is further configured such that the control-amount calculating portion 84 calculates the control amount of the control element in the above-indicated other of the differential and non-differential states of the continuously-variable transmission portion 11 (differential mechanism 16), on the basis of the learning compensation implemented by one of the differential-state and non-differential-state learning control portions 80D, 80N which is operable in the presently selected one of the differential and non-differential states of the continuously-variable transmission portion 11, and the shifting control portion controls the shifting action of the step-variable transmission portion 20 in the presently selected state of the continuously-variable transmission portion 11, on the basis of the control amount of the control element calculated by the control-amount calculating portion 84. Accordingly, the shifting action of the step-variable transmission portion in the presently selected state (differential or non-differential state) of the continuously-variable transmission portion 11 (differential mechanism 16) is controlled adequately so as to reduce the risk of generation of the shifting shock of the step-variable transmission portion 20, on the basis of the control amount calculated by the control-amount calculating portion 84 in the other state of the continuously-variable transmission portion 11.

The present embodiment is further arranged such that the learning control portion 80 includes the learning-sufficiency detecting portion 80C configured to determine whether the sufficient learning of the control amount of the control element has been effected by one of the differential-state and non-differential-state learning control portions 80D, 80N which is operable in the presently selected differential or non-differential states of the continuously-variable differential portion 11 in which the shifting action of the step-variable transmission portion 20 takes place, and such that the shifting control portion 54 controls the shifting action of the step-variable transmission portion 20 in the presently selected differential or non-differential state of the continuously-variable transmission portion 11 on the basis of the control amount calculated by the control-amount calculating portion 84, if the learning-sufficiency detecting portion 80C determines that the sufficient learning of the control amount has not been effected by the above-indicated one of the differential-state and non-differential-state learning control portions 80D, 80N. Accordingly, the shifting action of the step-variable transmission portion in the presently selected state (differential or non-differential state) of the continuously-variable transmission portion 11 (differential mechanism 16) is controlled adequately so as to reduce the risk of generation of the shifting shock of the step-variable transmission portion 20, on the basis of the control amount calculated by the control-amount calculating portion 84 in the other state of the continuously-variable transmission portion 11, even if the learning of the control amount by the differential-state or non-differential-state learning control portion operable in the presently selected state of the continuously-variable transmission portion 11 is insufficient or has not been effected at all.

The present embodiment is further configured such that the differential-state switching portion 50 places the continuously-variable transmission portion 11 in the differential state when the running speed V of the vehicle is relatively low or when the vehicle drive torque TOUT is relatively small, and in the non-differential state when the vehicle running speed V is relatively high or when the vehicle drive torque TOUT is relatively large, and the control-amount calculating portion 84 calculates the control amount of the control element in the non-differential state of the continuously-variable transmission portion 11, on the basis of the learning compensation of the control amount implemented by the differential-state learning control portion 80D in the differential state of the continuously-variable transmission portion 11. The shifting control portion 54 controls the shifting action of the step-variable transmission portion 20 in the presently selected non-differential state of the continuously-variable transmission portion 11, on the basis of the control amount calculated by the control-amount calculating portion 84 in the differential state of the continuously-variable transmission portion 11. Accordingly, the continuously-variable transmission portion 11 is more frequently placed in the differential state, than in the non-differential state, under the control of the differential-state switching portion 50, so that the learning compensation of the control amount is frequently implemented by the differential-state learning control portion 80D in the differential state, whereby the learning compensation by the differential-state learning control portion 80D progresses more rapidly than the learning compensation by the non-differential-state learning control portion 80N. The shifting control portion 54 controls the shifting action of the step-variable transmission portion 20 in the presently selected non-differential state of the continuously-variable transmission portion 11, on the basis of the control amount which is calculated by the control-amount calculating portion 84 in the differential state of the continuously-variable transmission portion 11 on the basis of the learning compensation of the control amount frequently implemented by the differential-state learning control portion 80D in the differential state of the continuously-variable transmission portion 11. Therefore, the shifting action in the non-differential state in which the learning compensation by the non-differential-state learning control portion 80N is relatively infrequently implemented can be controlled so as to prevent or reduce the risk of generation of the shifting shock of the step-variable transmission portion 20.

The vehicular drive system to which the control apparatus according to the present embodiment is provided with the step-variable automatic transmission portion 20, and therefore has a higher degree of fuel economy than a vehicular drive system provided with a continuously-variable transmission portion.

The present embodiment is further configured such that the engaging pressure of the coupling device of the step-variable automatic transmission portion 20 is controlled as the control amount of the control element by the shifting control portion 54, so as to prevent or reduce the risk of generation of the shifting shock, according to the learning compensation of the engaging pressure implemented by the learning control portion 80 on the basis of the change of the parameter indicative of the input shaft speed NIN of the step-variable transmission portion 20 in the transient state of the shifting action, more specifically, on the basis of a change of the racing amount GNIN of the input shaft speed NIN, which change reflects a state of the shifting action such as an entry into an inertia phase, so that the learning compensation can be effected accurately, assuring adequate control of the shifting action.

The present embodiment is configured such that the engaging pressure of the coupling device of the step-variable automatic transmission portion 20 is controlled as the control amount of the control element by the shifting control portion 54, so as to prevent or reduce the risk of generation of the shifting shock, according to the learning compensation of the engaging pressure implemented by the learning control portion 80 on the basis of the change of the parameter indicative of the input torque TIN of the step-variable transmission portion 20 in the transient state of the shifting action, which input torque is controlled by the torque-reduction control portion 82. In this respect, it is noted that the input torque of the transmission portion is controlled by controlling the engine 89, or the first or second electric motor M1, M2, so as to prevent an excessive rise (racing) or an excessive drop of a parameter indicative of the input shaft speed of the transmission portion, which would take place due to an inadequate control of the engaging pressure. Accordingly, the input torque TIN of the transmission portion 20 reflects an adequate or inadequate control of the engaging pressure of the coupling device during the shifting action of the transmission portion 20, so that the learning compensation of the engaging pressure can be accurately effected on the basis of the parameter indicative of the input torque TIN of the transmission portion.

In the present embodiment, the input torque of the step-variable automatic transmission portion 20 is a sum of the output torque of the continuously-variable transmission portion 11, and the output torque of the second electric motor M2 which is included in the continuously-variable transmission portion 11 and which is disposed in the power transmitting path between the power transmitting member 18 and the drive wheels 38. Accordingly, the input torque of the transmission portion 20 can be easily controlled.

In the present embodiment, the parameter indicative of the input torque of the step-variable automatic transmission portion 20 is calculated on the basis of the reaction torque of the first electric motor M1 which is included in the continuously-variable transmission portion 11 and to which the output of the engine 8 is distributed through the differential mechanism 16, so that the input torque of the transmission portion can be easily controlled.

The present embodiment is further configured such that the learning control portion 80 inhibits or restrict an operation of the control-amount calculating portion 84 when the learning abnormality detecting portion 88 has detected an abnormality relating to the learning compensation of the learning control portion 80, so that abnormal learning compensation of the control amount by the learning control portion 80 can be avoided when the learning abnormality detecting portion 88 has detected the abnormality, that is, when there is a large difference between the results of learning of the control amount by the differential-state and non-differential-state learning control portions 80D, 80N in the respective differential and non-differential states of the continuously-variable transmission portion 11.

The control apparatus according to the present embodiment includes the hybrid control portion 52 configured to control the operating states of the first and second electric motors M1, M2 such that the continuously-variable transmission portion 11 is operable as a continuously-variable transmission mechanism. Accordingly, during the shifting action of the step-variable transmission portion 20, the vehicular drive system as a whole is operable as a continuously variable transmission when the speed ratio of the continuously-variable transmission portion 11 is continuously changed in the direction opposite to the direction of change of the speed ratio of the step-variable transmission portion 20.

The present embodiment is further configured such that the control-amount calculating portion 84 calculates the control amount of the control element in the non-selected differential or non-differential state of the continuously-variable transmission portion 11, on the basis of the tendency of change of the learning compensation implemented by the differential-state or non-differential-state learning control portion which is operable in the presently selected differential or non-differential state of the continuously-variable transmission portion 11, Accordingly, the difference between the results of learning of the control amount by the differential-state and non-differential-state learning control portions 80D, 80N can be easily detected or confirmed simply by reference to the tendency of change of the learning compensation in the presently selected differential or non-differential state, rather to the amount of the learning compensation.

In the present embodiment, the step-variable automatic transmission portion 20 is provided with two coupling devices (e.g., brakes B3, B2) which are respectively released and engaged concurrently to perform the shifting action, and the learning control portion 80 effects the learning compensation of the control amounts of the two coupling devices in the process of releasing and engaging actions thereof. Accordingly, the shifting action of the step-variable automatic transmission portion 20 can be controlled with a high control response, so as to prevent or reduce the risk of generation of the shifting shock, by learning compensation of the control amounts in the form of the engaging pressures of the two coupling devices in the process of the concurrent releasing and engaging actions by the learning control portion 80.

There will be described a transmission mechanism 70 which is different from the transmission mechanism 10. The control apparatus according to the present invention is also applicable to the transmission mechanism 70. In the following description, the same reference characters as used for the transmission mechanism 10 will be used to identify the corresponding elements of the transmission mechanism 70.

Figures 15, 16:
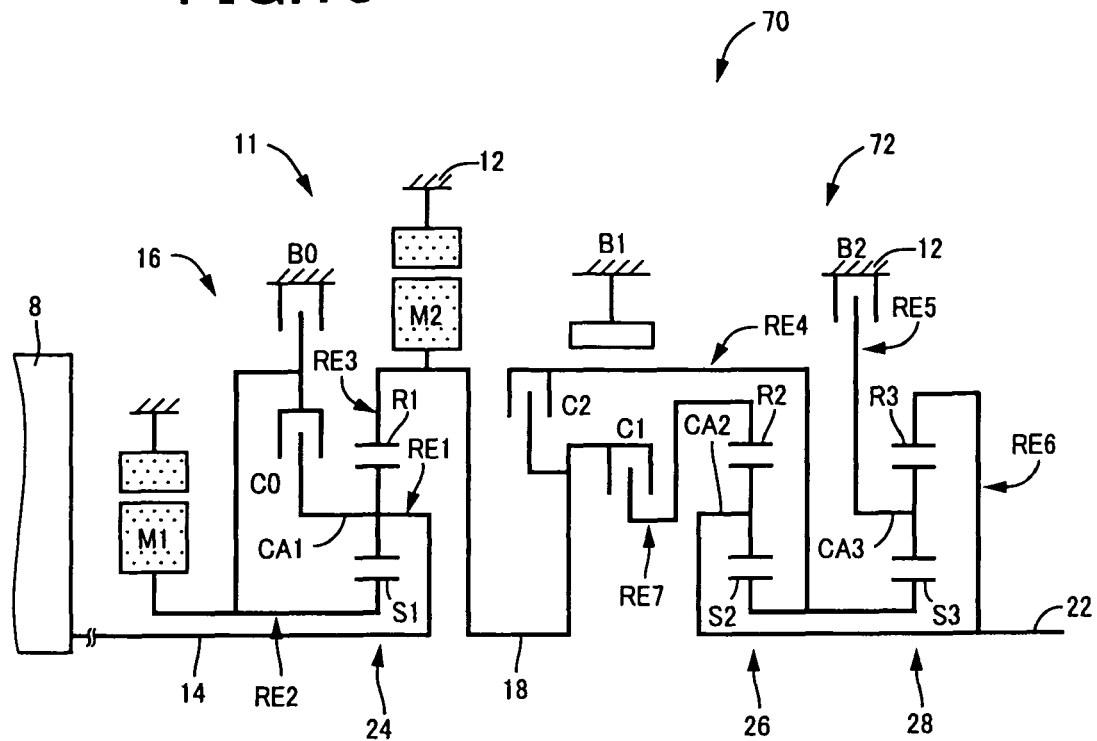
FIG. 15 is a schematic view corresponding to that of FIG. 1, showing an arrangement of another hybrid vehicle drive system to which the present invention is also applicable.
FIG. 16 is a table corresponding to that of FIG. 2, indicating shifting actions of the hybrid vehicle drive system of FIG. 15, which is operable in a selected one of the continuously-variable and step-variable shifting states, in relation to different combinations of operating states of hydraulically operated frictional coupling devices to effect the respective shifting actions.
Figure 17:
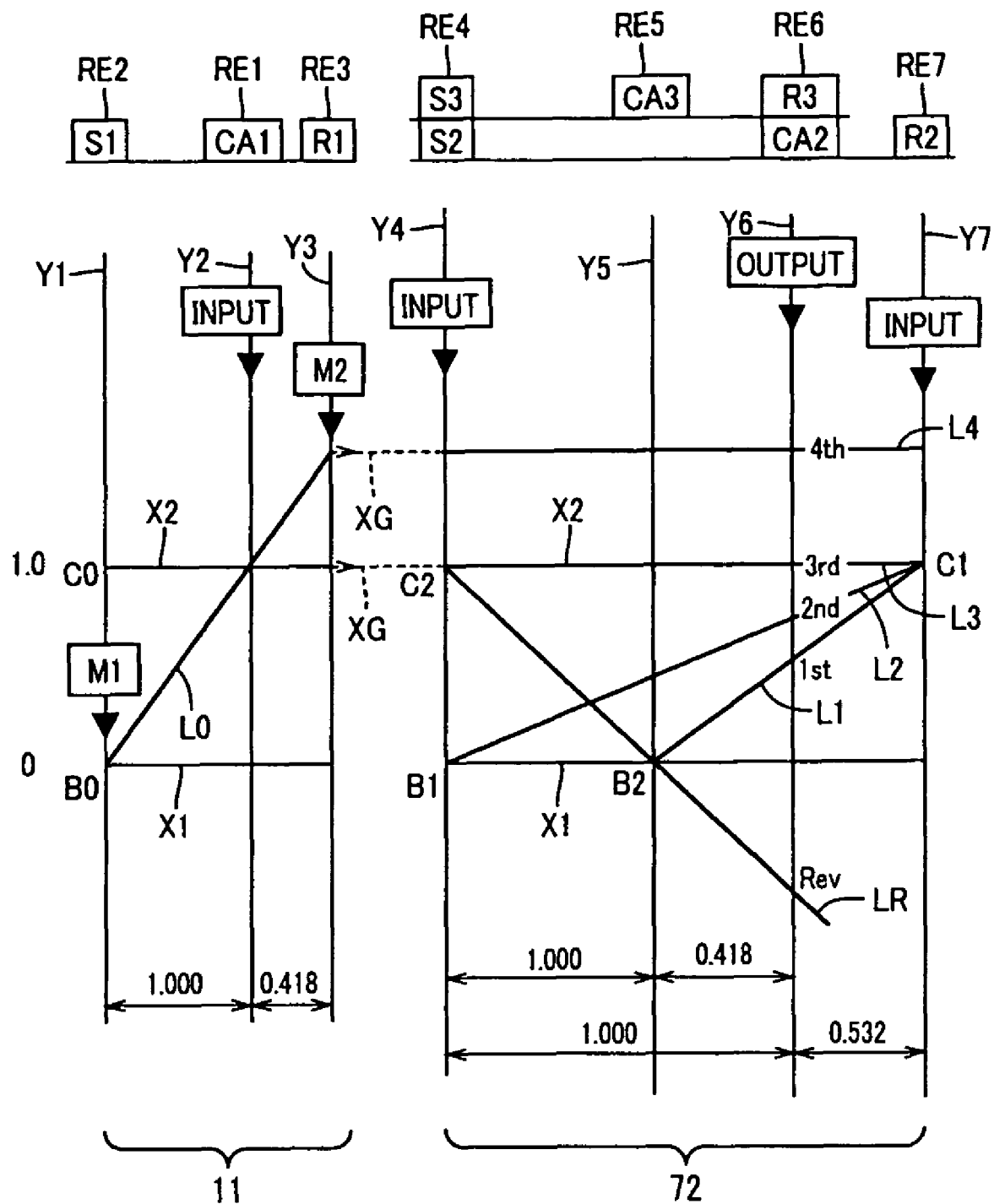
FIG. 17 is a collinear chart corresponding to that of FIG. 3, indicating relative rotating speeds of the rotary elements of the hybrid vehicle drive system of FIG. 15 in the step-variable shifting state, in the different gear positions.

FIG. 15 is a schematic view for explaining an arrangement of the transmission mechanism 70, and FIG. 16 a table indicating a relationship between the gear positions of the transmission mechanism 70 and different combinations of engaged states of the hydraulically operated frictional coupling devices for respectively establishing those gear positions, while FIG. 17 is a collinear chart for explaining a shifting operation of the transmission mechanism 70.

The transmission mechanism 70 includes the continuously-variable transmission portion 11 having the first electric motor M1, power distributing mechanism 16 and second electric motor M2, as in the preceding embodiment. The transmission mechanism 70 further includes an step-variable transmission portion 72 having three forward drive positions. The step-variable transmission portion 72 is disposed between the continuously-variable transmission portion 11 and the output shaft 22 and is connected in series to the continuously-variable transmission portion 11 and output shaft 22 through the power transmitting member 18. The power distributing mechanism 16 includes the single-pinion type first planetary gear set 24 having a gear ratio r1 of about 0.418, for example, and the switching clutch C0 and the switching brake B0. The step-variable transmission portion 72 includes the single-pinion type second planetary gear set 26 having a gear ratio r2 of about 0.532, for example, and the single-pinion type third planetary gear set 28 having a gear ratio r3 of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 16. Those gear positions have respective speed ratios g (input shaft speed NIN/output shaft speed NOUT) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as the continuously variable transmission described above. In the present transmission mechanism 70, therefore, a step-variable transmission is constituted by the transmission portion 20, and the continuously-variable transmission portion 11 which is placed in the fixed-speed-ratio shifting state by engagement of the switching clutch C0 or switching brake B0. Further, a continuously variable transmission is constituted by the transmission portion 20, and the continuously-variable transmission portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio g1 of about 2.804, for example, is established by engaging actions of the switching clutch C0, first clutch C1 and second brake B2, and the second gear position having the speed ratio g2 of about 1.531, for example, which is lower than the speed ratio g1, is established by engaging actions of the switching clutch C0, first clutch C1 and first brake B1, as indicated in FIG. 16. Further, the third gear position having the speed ratio g3 of about 1.000, for example, which is lower than the speed ratio g2, is established by engaging actions of the switching clutch C0, first clutch C1 and second clutch C2, and the fourth gear position having the speed ratio g4 of about 0.705, for example, which is lower than the speed ratio g3, is established by engaging actions of the first clutch C1, second clutch C2, and switching brake B0. Further, the reverse gear position having the speed ratio gR of about 2.393, for example, which is intermediate between the speed ratios g1 and g2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 are both released, as indicated in FIG. 16, so that the continuously-variable transmission portion 11 functions as the continuously variable transmission, while the step-variable transmission portion 72 connected in series to the continuously-variable transmission portion 11 functions as the step-variable transmission, whereby the speed of the rotary motion transmitted to the step-variable transmission portion 72 placed in one of the first through third gear positions, namely, the rotating speed of the power transmitting member 18 is continuously changed, so that the speed ratio of the transmission mechanism 10 when the step-variable transmission portion 72 is placed in one of those gear positions is continuously variable over a predetermined range. Accordingly, the total speed ratio of the step-variable transmission-portion 72 is continuously variable across the adjacent gear positions, whereby the overall speed ratio gT of the transmission mechanism 70 a whole is continuously variable.

The collinear chart of FIG. 17 indicates, by straight lines, a relationship among the rotating speeds of the rotary elements in each of the gear positions of the transmission mechanism 70, which is constituted by the continuously-variable transmission portion 11 functioning as the continuously-variable shifting portion or first shifting portion, and the step-variable transmission portion 72 functioning as the step-variable shifting portion or second shifting portion. The collinear chart of FIG. 17 indicates the rotating speeds of the individual elements of the power distributing mechanism 16 when the switching clutch C0 and brake B0 are both released, and the rotating speeds of those elements when the switching clutch C0 or brake B0 is engaged, as in the preceding embodiment, except in that the third rotary element RE3 (first ring gear R1) is connected to the power transmitting member 18 and the second electric motor M1.

In FIG. 17, four vertical lines Y4, Y5, Y6 and Y7 corresponding to the step-variable transmission portion 72 and arranged in the rightward direction respectively represent the relative rotating speeds of a fourth rotary element (fourth element) RE4 in the form of the second and third sun gears S2, S3 integrally fixed to each other, a fifth rotary element (fifth element) RE5 in the form of the third carrier CA3, a sixth rotary element (sixth element) RE6 in the form of the second carrier CA2 and third ring gear R3 that are integrally fixed to each other, and a seventh rotary element (seventh element) RE7 in the form of the second ring gear R2. In the step-variable transmission portion 72, the fourth rotary element RE4 is selectively connected to the power transmitting member 18 through the second clutch C2, and is selectively fixed to the casing 12 through the first brake B1, and the fifth rotary element RE5 is selectively fixed to the casing 12 through the second brake B2. The sixth rotary element RE6 is fixed to the output shaft 22 of the step-variable transmission portion 72, and the seventh rotary element RE7 is selectively connected to the power transmitting member 18 through the first clutch C1.

When the first clutch C1 and the second brake B2 are engaged, the step-variable transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 17. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed NE, with the drive force received from the continuously-variable transmission portion 11. When the switching clutch B0 is engaged in place of the switching clutch C0, the sixth rotary element RE6 is rotated at a speed higher than the engine speed NE, with the drive force received from the continuously-variable transmission portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 according to the present embodiment is also constituted by the continuously-variable transmission portion 11 functioning as the continuously-variable shifting portion or first shifting portion, and the step-variable transmission portion 72 functioning as the step-variable (automatic) shifting portion or second shifting portion, and the output shaft 22 is provided with the third electric motor M3, so that the present transmission mechanism 70 has advantages similar to those of the first embodiment.

While the preferred embodiment of the control apparatus of this invention as applied to the transmission mechanisms 10, 70 has been described in detail by reference to the accompanying drawings, it is to be understood that the present invention may be otherwise embodied.

In the power distributing mechanism 16 described above, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed or connected to any other elements selected from the three elements CA1, S1 and R1 of the first planetary gear set 24, either directly or through a clutch or planetary gear.

In the illustrated transmission mechanisms 10, 70 described above, the first electric motor M1 and the second electric motor M2 are disposed coaxially with the input shaft 14, and are fixed to the first sun gear S1 and the power transmitting member 18, respectively. However, this arrangement is not essential. For example, the first and second electric motors M1, M2 may be operatively connected to the first sun gear S1 and the power transmitting member 18 or output shaft 20, respectively, through gears or belts.

Although the power distributing mechanism 16 described above is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

In the illustrated transmission mechanisms 10, 70 provided as a power transmitting device, the electrically controlled transmission portion in the form of the continuously-variable transmission portion 11 and the step-variable transmission portion 20, 72 are connected in series to each other such that the output of the engine 8 is transmitted first to the electrically controlled transmission portion, and then to the step-variable transmission portion 20. However, the continuously-variable transmission portion 11 and the step-variable transmission portion 20, 72 may be connected in series to each other such that the output of the engine 8 is transmitted first to the step-variable transmission portion 20, 72, and then to the continuously-variable transmission portion 11.

In the illustrated transmission mechanisms 10, 70, the electrically controlled transmission portion in the form of the continuously-variable transmission portion 11 and the step-variable transmission portion 20, 72 are mechanically independent of each other and connected in series to each other. However, the control apparatus according to the principle of the present invention is applicable to a vehicle drive system having an electrically controlled differential function, and a shifting function different from the electrically controlled differential function. The transmission portions having these differential and shifting functions need not be mechanically independent of each other. For instance, the control apparatus of the present invention is applicable to a vehicle drive system including two planetary gear sets which are connected to each other and in which the internal combustion engine, electric motors and drive wheels are connected to rotary elements of the planetary gear sets, and wherein clutches and brakes associated with the rotary elements of the planetary gear sets are selectively engaged and released to perform step-variable shifting actions and continuously-variable shifting actions.

While the switching clutch C0 is engaged to establish the neutral position N in the transmission mechanism 10, 70 in the illustrated embodiment, the switching clutch C0 need not be engaged to establish the neutral position.

The hydraulically operated frictional coupling devices used as the switching clutch C0, switching brake B0, etc. in the illustrated transmission mechanisms 10, 70 may be replaced by a coupling device of a magnetic-power type, an electromagnetic type or a mechanical type, such as a powder clutch (magnetic powder clutch), an electromagnetic clutch and a meshing type dog clutch.

While the second electric motor M2 is connected to the power transmitting member 18 or the output shaft 22 in the illustrated embodiment, the second electric motor M2 may be connected to a rotary member of the step-variable transmission portion 20, 70.

While the illustrated step-variable transmission portions 20, 72 are connected in series to the continuously-variable transmission portion 11 through the power transmitting member 18, the step-variable transmission portion 20, 72 may be mounted on and disposed coaxially with a counter shaft which is parallel to the input shaft 14. In this case, the continuously-variable transmission portion 11 and the step-variable transmission portion 20, 72 are operatively connected to each other through a suitable power transmitting device or a set of two power transmitting members such as a pair of counter gears, and a combination of a sprocket wheel and a chain.

The illustrated power distributing mechanism 16 provided as a differential mechanism in the illustrated transmission mechanisms 10, 70 may be replaced by a differential gear device including a pinion rotated by the engine, and a pair of bevel gears which are respectively operatively connected to the first and second electric motors M1, M2.

While the illustrated power distributing mechanism 16 is constituted by one planetary gear set 24, it may be constituted by two or more planetary gear sets so that the power distributing mechanism 16 is operable as a transmission having three or more gear positions in the non-differential state (fixed-speed-ratio shifting state).

The shifting device 90 in the illustrated transmission mechanisms 10, 70 is provided with the shift lever 92 for selecting a plurality of shift positions. However, the shift lever 92 may be replaced by a pushbutton switch, a slide type switch or any other switch for selecting a plurality of shift positions, a device operable to select a plurality of shift positions in response to a voice of the vehicle operator rather than a manual operation of the vehicle operator, or a device operable to select a plurality of shift positions in response to a foot operation of the vehicle operator. When the shift lever 92 is placed in the position M, the number of the selectable gear positions can be selected. However, the highest gear position selectable can be selected by the shift lever 92 placed in the position M. In this case, the step-variable transmission 20, 72 is shifted when the highest gear position selectable is changed. When the shift lever 92 is manually operated from the position M to the shift-up position "+" or the shift-down position "−", the step-variable transmission 20 is shiftable to any one of the first through fourth gear positions.

In the illustrated embodiment, the continuously-variable transmission portion 11 is placed in the differential state and operated as a continuously-variable transmission mechanism by controlling the operating state of the electric motors M1, M2. However, the continuously-variable transmission portion 11 may be replaced by an electrically controlled differential portion operable as a step-variable transmission mechanism having a multiplicity of speed ratio positions within the range of the speed ratio of the above-indicated continuously-variable transmission mechanism.

In the illustrated embodiment, the learning-sufficiency detecting portion 80C is configured to determine that the learning which has been effected by each of the differential-state and non-differential-state learning control portions 80D, 80N is sufficient, if the numbers of learning cycles for all of the shifting actions of the step-variable transmission portion 20 in the corresponding differential or non-differential state of the continuously-variable transmission portion 11 have exceeded a predetermined threshold value. However, the learning-sufficiency detecting portion 80C may be configured to determine that the learning is sufficient if the number of learning cycles for only the shifting action of the step-variable transmission 20 in question has exceeded the predetermined threshold value. In this case, the learning compensation by the differential-state and non-differential-state learning control portions 80D, 80N can be more frequently utilized for controlling the relevant shifting action of the step-variable transmission portion 20. Similarly, the learning abnormality detecting portion 88 may be modified to make the determination as to whether the learning compensation by the learning control portions 80D, 80N is abnormal, on the basis of a difference between the results of learning by these two learning control portions 80D, 80N for only the shifting action in question.

In the illustrated embodiment, the control-amount calculating portion is configured to calculate the compensation amount of the control amount on the basis of the result of learning on the basis of one of the parameters indicated in the graphs of FIGS. 10-12. However, the control-amount calculating portion may be modified to calculate the compensation amount on the basis of the result of learning on the basis of the result of learning by the learning control portion 80 which is implemented on the basis of a combination of a plurality of parameters and according to predetermined weights given to the respective parameters in view of different degrees of contribution of the parameters to the control amount.

In the illustrated example of FIG. 13, the control-amount calculating portion 84 calculates the compensation amount of the control amount in the non-differential state of the continuously-variable transmission portion 11 on the basis of the result of learning of the control amount by the differential-state learning control portion 80D. However, the control-amount calculating portion 84 may calculate the compensation amount of the control amount in the differential state of the continuously-variable transmission portion 11 on the basis of the result of learning of the control amount by the non-differential-state learning control portion 80N. Where a high-speed running test of the vehicle is conducted using a chassis dynamo prior to shipment of the vehicle from a manufacturer, in the step-variable shifting state of the transmission mechanism 10, 70, sufficient learning of the control amount can be effected by the non-differential-state learning control portion 80N during this test conducted in the non-differential state of the continuously-variable transmission portion 11. Where the learning of the control amount effected by the differential-state learning control portion 80D is insufficient immediately after the test, the control-amount calculating portion 84 calculates the compensation amount of the control amount during a shifting action of the step-variable transmission portion 20 in the differential state of the continuously-variable transmission portion 11, on the basis of the result of learning by the non-differential-state learning control portion 80N.

In the illustrated embodiment, the learning control portion 80 is configured to invalidate the results of learning of the control amount by the differential-state and non-differential-state learning control portions 80D, 80N when the learning abnormality detecting portion 88 has detected an abnormality relating to the learning by the learning control portion 80. However, the learning abnormality detecting portion 88 may be modified to determine which one of the results of learning by the differential-state and non-differential-state learning control portions 80D, 80N is abnormal. In this case, the learning control portion 80 invalidates only the result of learning by one of the differential-state and non-differential-state learning control portions 80D, 80N, which result of learning is determined to be abnormal. Although the control routine illustrated in the flow chart of FIG. 13 does not include a step corresponding to the learning abnormality detecting portion 88, this step may precede the step S4 and/or the step S6, for determining whether the result of learning by the differential-state or non-differential-state learning control portion 80D, 80N or the results of learning by the two learning control portions 80D, 80N is/are abnormal or not.

In the illustrated embodiment, the torque reduction amount DTM2 is a product of the reduction amount of the output torque TM2 and the reduction time of the input torque NIN. However, the torque reduction amount DTM2 may be determined on the basis of only the reduction amount of the output torque TM2, or only the reduction time of the input torque TIN. In this respect, it is noted that the reduction amount of the output torque TM2 and the reduction time of the input torque TIN tend to increase with the racing amount of the input shaft speed NIN of the step-variable transmission portion 20.

While the operation of the control apparatus including the learning control portion 80, etc. has been described with respect to the shift-up action of the step-variable transmission portion 20 by way of example, the control apparatus is equally applicable to any other shifting action of the step-variable transmission portion 20.

It is to be understood that the present invention may be embodied with various other changes and modifications which may occur to those skilled in the art, without departing from the spirit and scope of the invention defined in the appended claims.

What is claimed is:

1. A control apparatus for a vehicular drive system including (a) an electrically controlled differential portion having an input shaft, an output shaft, a differential mechanism, and an electric motor which is operatively connected to a rotary element of the differential mechanism and an operating state of which is controlled to control a differential state between rotating speeds of the input and output shafts, and (b) a transmission portion which constitutes a part of a power transmitting path between the differential portion and a drive wheel of a vehicle, said control apparatus comprising (i) a differential-state switching portion configured to switch the differential portion between a differential state in which the differential portion is operable to perform a differential function, and a non-differential state in which the differential portion is not operable to perform the differential function, (ii) a shifting control portion configured to control a shifting action of the transmission portion, and (iii) a learning control portion configured to effect learning compensation of a control amount of a control element to be controlled during the shifting action of the transmission portion, wherein an improvement comprises:

said learning control portion including a differential-state learning control portion operable to implement the learning compensation of the control amount of the control element when the shifting action of the transmission portion takes place in the differential state of the electrically controlled differential portion, and a non-differential-state learning control portion operable to implement the learning compensation of the control amount when the shifting action takes place in the non-differential state of the electrically controlled differential portion; and said shifting control portion being configured to control the shifting action of the transmission portion in a presently selected one of the differential and non-differential states of the electrically controlled differential portion, on the basis of the learning compensation which has been implemented by one of said differential-state and non-differential-state learning control portions which is operable in the other of the differential and non-differential states of the electrically controlled differential portion.

2. The control apparatus according to claim 1, further comprising a control-amount calculating portion configured to calculate the control amount of said control element in said other of the differential and non-differential states of the electrically controlled differential portion, on the basis of the learning compensation implemented by one of the differential-state and non-differential-state learning control portions which is operable in said presently selected one of the differential and non-differential states of the electrically controlled differential portion, and wherein said shifting control portion controls the shifting action of the transmission portion in the presently selected state of the electrically controlled differential portion, on the basis of the control amount of the control element calculated by said control-amount calculating portion.

3. The control apparatus according to claim 2, wherein said learning control portion further includes a learning-sufficiency detecting portion configured to determine whether sufficient learning of the control amount of said control element has been effected by one of the differential-state and non-differential-state learning control portions which is operable in said presently selected one of the differential and non-differential states of the electrically controlled differential portion, and said shifting control portion controls the shifting action of the transmission portion in the presently selected state of the electrically controlled differential portion on the basis of the control amount of the control element calculated by said control-amount calculating portion, if said learning-sufficiency detecting portion determines that that the sufficient learning of the control amount has not been effected by said one of the differential-state and non-differential-state learning control portions.

4. The control apparatus according to claim 2, wherein said differential-state switching portion places the electrically controlled differential portion in said differential state when the vehicle is running at a relatively low speed or with a relatively small drive torque, and in said non-differential state when the vehicle is running at a relatively high speed or with a relatively large drive torque, and said control-amount calculating portion calculates the control amount of the control element in the non-differential state of the electrically controlled differential portion, on the basis of the learning compensation of the control amount implemented by said differential-state learning control portion in the differential state of the electrically controlled differential portion, said shifting control portion controlling the shifting action of the transmission portion in the presently selected non-differential state of the electrically controlled differential portion, on the basis of the control amount calculated by the control-amount calculating portion in the differential state of the electrically controlled differential portion.

5. The control apparatus according to claim 1, wherein said transmission portion is a step-variable automatic transmission portion.

6. The control apparatus according to claim 5, wherein said control element is a coupling device operated to perform the shifting action of said step-variable automatic transmission portion, and said control amount is an engaging pressure of the coupling device, said learning control portion effecting the learning compensation of the engaging pressure of the coupling device, on the basis of a change of a parameter indicative of an input shaft speed of the step-variable automatic transmission portion in a transient state of the shifting action.

7. The control apparatus according to claim 5, wherein said control element is a coupling device operated to perform the shifting action of said step-variable automatic transmission portion, and said control amount is an engaging pressure of the coupling device, said learning control portion effecting the learning compensation of the engaging pressure of the coupling device, on the basis of a change of a parameter indicative of an input torque of the step-variable automatic transmission portion in a transient state of the shifting action.

8. The control apparatus according to claim 7, wherein the vehicular drive system further includes an engine, and a power transmitting member connecting said differential mechanism and said transmission portion, and said electrically controlled differential portion includes a first electric motor to which an output of the engine is distributed through the differential mechanism, and a second electric motor connected to the power transmitting member, and wherein said parameter indicative of the input torque of the transmission portion is a parameter indicative of a sum of an output torque of the differential mechanism and an output torque of the second electric motor.

9. The control apparatus according to claim 7, wherein said the vehicular drive system further includes an engine, and a power transmitting member connecting said differential mechanism and said transmission portion, and said electrically controlled differential portion includes a first electric motor to which an output of the engine is distributed through the differential mechanism, and a second electric motor disposed in a power transmitting path between the power transmitting member and the drive wheel of the vehicle, and wherein said parameter indicative of the input torque of the transmission portion is calculated on the basis of a reaction torque of said first electric motor in the differential state of the electrically controlled differential portion.

10. The control apparatus according to claim 2, further comprising a learning abnormality detecting portion configured to detect an abnormality relating to the learning compensation of the control amount of said control element by said learning control portion, when there exists a difference between results of learning of the control amount by said differential-state and non-differential-state learning control portions operable in the respective differential and non-differential states of the electrically controlled differential portion, and wherein said learning control portion inhibits or restrict an operation of the control-amount calculating portion when the learning abnormality detecting portion has detected said abnormality.

11. The control apparatus according to claim 1, further comprising a hybrid control portion configured to control an operating state of said electric motor such that said electrically controlled differential portion is operable as a continuously-variable transmission mechanism.

12. The control apparatus according to claim 2, wherein said control-amount calculating portion calculates the control amount of said control element in said other of the differential and non-differential states of the electrically controlled differential portion, on the basis of a tendency of change of the learning compensation implemented by said one of the differential-state and non-differential-state learning control portions which is operable in said presently selected one of the differential and non-differential states of the electrically controlled differential portion.

13. The control apparatus according to claim 2, wherein said transmission portion is provided with two coupling devices which are respectively released and engaged concurrently to perform the shifting action, and said learning control portion effects the learning compensation at least one of the control amounts of the two coupling devices in the process of releasing and engaging actions thereof.

14. The control apparatus according to claim 1, wherein said shifting action of the transmission portion is performed such that a speed ratio of the transmission portion is changed in a direction opposite to a direction of change of a speed ratio of the electrically controlled differential portion.

15. The control apparatus according to claim 1, wherein said transmission portion is a step-variable transmission portion, and said differential-state learning control portion implements the learning compensation of the control amount of the control element such that an amount of compensation of said control amount increases with an increase of a racing amount of an input shaft speed of the step-variable transmission portion.

16. The control apparatus according to claim 1, wherein the vehicular drive system further includes an engine, and a power transmitting member connecting said differential mechanism and said transmission portion, and said electrically controlled differential portion includes a first electric motor to which an output of the engine is distributed through the differential mechanism, and a second electric motor connected to the power transmitting member, and wherein said differential-state learning control portion implements the learning compensation of the control amount of the control element such that an amount of compensation of said control amount increase with an increase of an amount of reduction of an output torque of said second electric motor.

17. The control apparatus according to claim 1, wherein the vehicular drive system further includes an engine, and a power transmitting member connecting said differential mechanism and said transmission portion, and said electrically controlled differential portion includes a first electric motor to which an output of the engine is distributed through the differential mechanism, and a second electric motor connected to the power transmitting member, and wherein said differential-state learning control portion implements the learning compensation of the control amount of the control element such that an amount of compensation of said control amount increases with an increase of an amount of reduction of a reaction torque of said first electric motor.

* * * * *